United States Patent
Kawai et al.

(10) Patent No.: US 9,490,499 B2
(45) Date of Patent: Nov. 8, 2016

(54) NEGATIVE ELECTRODE ACTIVE MATERIAL FOR LITHIUM ION RECHARGEABLE BATTERY AND NEGATIVE ELECTRODE USING THE SAME

(75) Inventors: Takanobu Kawai, Shiga (JP); Ken-ichi Hongawa, Shiga (JP); Hayato Matsumoto, Shiga (JP); Kazuaki Yamashita, Shiga (JP)

(73) Assignee: NIPPON CARBON CO., LTD., Chuo-ku, Tokyo (JP)

( * ) Notice: Subject to any disclaimer, the term of this patent is extended or adjusted under 35 U.S.C. 154(b) by 1132 days.

(21) Appl. No.: 12/309,330

(22) PCT Filed: Jul. 6, 2007

(86) PCT No.: PCT/JP2007/000739
§ 371 (c)(1),
(2), (4) Date: Aug. 10, 2009

(87) PCT Pub. No.: WO2008/010312
PCT Pub. Date: Jan. 24, 2008

(65) Prior Publication Data
US 2009/0311599 A1    Dec. 17, 2009

(30) Foreign Application Priority Data

Jul. 19, 2006 (JP) .................................. 2006-197043
Jun. 25, 2007 (JP) .................................. 2007-166226

(51) Int. Cl.
| | |
|---|---|
| *H01M 4/58* | (2010.01) |
| *H01M 10/0525* | (2010.01) |
| *H01M 4/583* | (2010.01) |
| *H01M 4/133* | (2010.01) |
| *H01M 4/587* | (2010.01) |
| *H01M 4/02* | (2006.01) |

(52) U.S. Cl.
CPC ......... *H01M 10/0525* (2013.01); *H01M 4/133* (2013.01); *H01M 4/583* (2013.01); *H01M 4/587* (2013.01); *H01M 2004/021* (2013.01); *Y02E 60/122* (2013.01); *Y02P 70/54* (2015.11); *Y02T 10/7011* (2013.01); *Y10T 29/49115* (2015.01)

(58) Field of Classification Search
CPC .............................. H01M 4/133; H01M 4/583
USPC ................................ 429/217, 231.8; 423/448
See application file for complete search history.

(56) References Cited

U.S. PATENT DOCUMENTS

| | | | |
|---|---|---|---|
| 2005/0233222 A1* | 10/2005 | Yanagida et al. | 429/324 |
| 2006/0035149 A1* | 2/2006 | Nanba et al. | 429/218.1 |
| 2006/0073387 A1* | 4/2006 | Sakagoshi et al. | 429/231.8 |
| 2007/0128518 A1* | 6/2007 | Uono et al. | 429/231.4 |
| 2007/0178382 A1* | 8/2007 | Kim et al. | 429/232 |

* cited by examiner

*Primary Examiner* — Ula C Ruddock
*Assistant Examiner* — Frank Chernow
(74) *Attorney, Agent, or Firm* — Flynn, Thiel, Boutell & Tanis, P.C.

(57) ABSTRACT

A negative electrode active material for a lithium ion secondary battery, made up of substantially spherical graphite particles (A), having fine protrusions on the surfaces thereof and obtained by impregnating and coating substantially spherical graphite particles with a mixture of pitch and carbon black, followed by baking in a range of 900 to 1500° C. In accordance with Raman spectroscopic analysis of the particles (A) using argon laser Raman scattering light, there exists a G-band composite peak comprising peaks in the vicinity of 1600 cm$^{-1}$, and 1580 cm$^{-1}$, respectively, and at least one peak in the vicinity of D-band at 1380 cm$^{-1}$, an interlayer distance of the lattice plane $d_{002}$, obtained by wide-range X-ray diffraction, being in the range of 0.335 to 0.337 nm.

8 Claims, 11 Drawing Sheets

NEGATIVE ELECTRODE ACTIVE MATERIAL FOR LITHIUM ION RECHARGEABLE BATTERY AND NEGATIVE ELECTRODE USING THE SAME

FIELD OF THE INVENTION

The present invention relates to a negative electrode active material for a lithium ion rechargeable battery for use in a notebook computer, a cellular phone, and so forth, and in particular, to a negative electrode having a high capacity, less capacity loss, and excellent charge and discharge repeatability (cycle characteristics), and a negative electrode active material. Further, the present invention relates to a negative electrode active material for use in a negative electrode having a high power, and a high output, such as a carbon negative electrode for use in a medium/large sized lithium ion rechargeable battery for use in an electric bicycle (E-bike), a hybrid electric vehicle (HEV), and so forth, a method of preparation thereof, and a negative electrode using the negative electrode active material.

BACKGROUND OF THE INVENTION

The lithium ion rechargeable battery has been in widespread use as a small and light-weight rechargeable battery having a high capacity and a high voltage, suitable for use in portable equipment such as a cellular phone, a video camera, and so forth. Further, the lithium ion rechargeable battery having a high-output has lately come into widespread use as a power supply for an electric power tool requiring a large amount of power.

As there has been no signs of a slowdown in the trend for portable equipment towards further miniaturization, higher performance, and higher function, as it is expected to minimize and to make it lighter, a higher capacity for the lithium ion rechargeable battery has been sought.

Attempts have been made to improve the performance of each component of the lithium ion rechargeable battery and materials thereof. Among other things, efforts have been focused on improving the density and the capacity of a negative electrode material, which is considered to be a limiting factor in the performance of the lithium ion rechargeable battery, and that spheroidizing of a graphite particle for improving the performance is proposed in Patent No. Jp 2983003.

Further, in Patent Document 5 (JP 7-249411 A), it has been disclosed that for the purpose of obtaining a negative electrode material for a lithium ion secondary battery having a large discharge capacity, pretreatment is applied to a carbonizable material at a pressure not lower than 10 kgf/cm$^2$, and a heat treatment temperature not higher than 600° C. in an inert atmosphere to be subsequently subjected to carbonization treatment at a temperature in a range of about 500 to 3300° C. More specifically, it has been described that carbonization is conducted in a range of 1500 to 3300° C. if the carbonizable material is a material easy to carbonize, and in a range of 500 to 1500° C. if the carbonizable material is a material hard to carbonize.

In Patent Document 6 (JP 11-73963 A), there has been described a negative electrode composite material for a lithium ion secondary battery, wherein a binder is carbonized into a matrix carbon, that is produced by a process comprising the steps of forming a slurry comprised of filler graphite, a carbonizable binder, and a solvent for dissolving the binder into spheres by use of a spray—dry method, obtaining agglomerates by drying the spheres, and subsequently rendering the binder infusible or heating the agglomerates in a range of 900 to 1400° C. in an inert atmosphere without rendering the binder infusible Patent Document 1 JP 2983003
Patent Document 2 JP 3588354
Patent Document 3 JP 3716830
Patent Document 4 JP 3716818
Patent Document 5 JP7-249411A
Patent Document 6 JP11-73963 A

DISCLOSURE OF THE INVENTION

It is widely known that the discharge capacity per unit weight of the carbon-based negative electrode material has substantially reached to a theoretical value thereof, and in order to enhance a battery capacity, it is required that the negative electrode material should be packed into a battery as much as possible, that is, a negative electrode density must be higher than 1.7 g/cm$^3$, preferably higher than 1.8 g/cm$^3$. Furthermore, an inexpensive negative electrode of a higher productivity and capable of maintaining a high capacity is required.

Meanwhile, from the viewpoint of environmental issues, an electric vehicle, particularly, a hybrid electric vehicle (HEV) using a nickel-hydrogen battery in combination with a gasoline engine has been developed, and an attention is focused on a lithium ion battery higher in energy density, and generating a high voltage as a power supply source for use in an HEV of the next generation.

Higher input/output characteristics as compared with those used for a small-sized lithium ion battery used for conventional portable equipment are required of the lithium ion battery used for the HEV, however, the lithium ion battery used for the HEV is just at the beginning of development.

In order to manufacture a low cost battery, it is necessary to use an inexpensive material having a long life performance, and the same can be said of a negative electrode material.

In order to obtain a high-capacity battery, a vein and flake natural graphite used for a negative electrode is preferable as it is inexpensive, and its supply is stable. However, the vein and flake natural graphite has a charge/discharge efficiency less than 90%, and particles thereof, when applied to a copper foil to serve as an electrode, are oriented in one direction on a plane, consequently the cycle characteristics and performance at low temperature are not satisfactory.

Further, as the electrode density is increased, the particles thereof stick to one another, thereby clogging a flow path formed between the particles through which an electrolyte is to flow, and which leads to problems such as a deterioration in battery characteristics, and so forth. Therefore, it is not practical to use the vein and flake natural graphite in a natural state.

In order to solve this problem, there have been developed graphite particles produced by reforming vein and flake natural graphite particles to a spherical shape and applying a coating to the surface thereof, however, the product cost is largely dependent on the coating process. For example, in the case of a method of depositing pyrocarbon on the surface of each of the graphite particles by a CVD process, it requires expensive facilities and highly-developed operating techniques and, furthermore, since there exists a problem with productivity, it is difficult to supply the products at a low cost.

A method of coating the surface with a resin and pitch is carried out by the use of, for example, a heating kneader, or mechanical treatment (mechanochemical process). With the use of the heating kneader, production is feasible at a relatively low cost, but the mechanochemical process is inferior in terms of productivity to a method using the heating kneader.

A coating formed on the surface of the graphite particles produced by any of those methods is smooth.

Since the graphite particles produced by a conventional method is substantially spherical in shape and has a smooth surface, if an electrode is made by the use of the graphite particles, and charge/discharge are repeated with the electrode, there will occur a decrease in the number of contact points between the particles of a negative electrode material, due to repetition of the expansion/contraction of the negative electrode material, thereby causing an electrically conductive network inside the electrode to collapse, so that a problem is prone to occur as to the cycle characteristics.

The present invention proposes graphite particles to serve as a negative electrode material for a lithium ion rechargeable battery which are high in discharge capacity per unit volume, small in capacity loss at the time of initial charge/discharge, and excellent in load characteristics at the time of quick charge/discharge, and so forth, and a negative electrode using the same.

SUMMARY OF THE INVENTION

The inventors have continued researches on the graphite particles produced by rendering the vein and flake natural graphite spherical in shape and applying a coating to the surface thereof and, as a result, have found that graphite particles having the following structure are suitable for use as a negative electrode material for a lithium ion secondary battery.

The graphite particles include graphite particles (A), each being substantially spherical in shape and having fine protrusions on the surface thereof, obtained by impregnating and coating a matrix of vein and flake natural graphite, rendered spherical in shape, with a mixture of pitch and carbon black, to be subsequently baked at a temperature in a range of 900 to 1500° C., and graphite particles (B), each being substantially spherical in shape and having fine protrusions on the surface thereof, obtained by further graphitizing the graphite particles (A) at a high temperature.

Further, a mixture of the graphite particles (A) and the graphite particles (B) can be similarly used as the negative electrode material.

Further, graphite particles (A), each particle being substantially spherical in shape and having fine protrusions on the surface thereof, obtained by impregnating and coating a matrix of vein and flake natural graphite, rendered spherical in shape, with a mixture of pitch and carbon black, to be subsequently baked in a range of 900 to 1500° C., before pulverization and screening, mixed with carbonaceous particles (C) obtained by baking the mixture of pitch and carbon black in the range of 900 to 1500° C. before sizing is also useful as the negative electrode active material for the lithium ion secondary battery.

The negative electrode active materials have a G-band composite peak comprising peaks in the vicinity of 1600 $cm^{-1}$ and 1580 $cm^{-1}$, respectively, and at least one peak in the vicinity of a D-band at 1380 $cm^{-1}$, in Raman spectroscopic analysis using argon laser Raman scattering light at a wavelength of 514.5 nm, an interlayer distance of a lattice plane, $d_{002}$, obtained by wide-range X-ray diffraction, being in a range of 0.335 to 0.337 nm, so that the negative electrode active material is a powdery carbon material of a multi-layer structure, serving as an excellent negative electrode active material for a lithium ion secondary battery, having both high-output characteristics and high energy density.

Natural graphite rendered spherical in shape, for use in the graphite particles (A), and the graphite particles (B), respectively, having an average particle diameter in a range of on the order of 3 to 25 μm, can be put to use. The natural graphite spherical in shape, not more than 3 μm in average particle diameter, is not preferable not only because of a drawback in respect of cost, as it is difficult to render the natural graphite spherical in shape, thereby causing a decrease in productivity, but also because of the difficulty in producing a homogeneous complex with a particle size distribution under control since a particle size is small when the natural graphite is turned into the complex by impregnating and coating the same with pitch and carbon black.

With natural graphite having a spherical shape, exceeding 25 μm in average particle diameter, a proportion of particles existing therein, exceeding 70 μm in maximum particle diameter, becomes high due to the particle size distribution and a problem will arise upon coating in the case of an electrode having a small thickness on the order of 40 μm as generally considered, so that the particles are preferably controlled to about 25 μm in average particle diameter at most, and to the order of 75 μm at the maximum.

As for the graphite particle (A), graphite particles (A1, A2, A3, . . . ) obtained by impregnating and coating not less than two kinds of matrices, an average particle diameter of a spherical natural graphite particle making up each of the matrices being varied, with a mixture of pitch and carbon black, respectively, to be baked at a temperature in a range of 900 to 1500° C. before pulverization and screening, the graphite particles (A1, A2, A3, . . . ) mixed with each other, and the graphite particles (A1, A2, A3, . . . ) mixed with the carbonaceous particles (C1, C2, . . . ), at an optional mixing ratio according to a purpose such as powder physical properties, and so forth, may be used as a negative electrode active material for a lithium ion secondary battery.

The graphite particles (A) are obtained by applying impregnation • mixing • thermal kneading to natural graphite reduced spherical in shape, using carbon black and pitch, thereby coating the surface of work in process with the carbon black and the pitch, to be baked at a high temperature for carbonization, followed by sizing through pulverization and screening. The natural spherical graphite, carbon black, and pitch may be mixed with each other to be subsequently thermally kneaded, or the carbon black may be added while the natural spherical graphite is thermally kneaded with the pitch. Herein, thermal kneading refers to an operation whereby the process materials are charged into a kneader and so on, and are kneaded with each other while heating is applied thereto.

The graphite particles (A) have numerous fine protrusions composed of a composite material of carbon originating from the carbon black, and carbon originating from the pitch, formed on the surface thereof. Accordingly, the graphite particle (A) has a large surface area as compared with a particle having a smooth surface and there are many contact points formed between the particles, so that a multitude of electrically conducting networks are built in a complex way within an electrode, thereby causing the electrical resistance of the negative electrode to be lowered. Thus, the graphite particles (A) can serve as a negative electrode material having excellent rapid charge/discharge and power characteristics.

The amount of the carbon black is preferably in a range of 2 to 50 parts by weight against 100 parts by weight of the natural graphite. If the amount of the carbon black corresponds to less than 2% against an amount of the natural graphite, the fine protrusions will be less in amount, so that satisfactory results cannot be obtained. If the amount of the carbon black exceeds 50%, a specific surface area will become excessively large, which is not preferable because of an excessively large capacity loss.

Heating is carried out at a temperature in a range of 900 to 1500° C. in a non-oxidizing atmosphere. Heating at a temperature below 900° C. is not preferable because functional groups remain on respective surfaces of the particles to react with lithium ions, resulting in an increase of capacity loss and occurrence of an infection point of a discharge curve, in the vicinity of 1V.

Graphitization treatment generally refers to heat treatment applied at a temperature not lower than 2000° C. Accordingly, in the case of producing the graphite particles (A), heat treatment in a range of 900 to 2000° C. is applied. However, since around 2000° C. which heat treatment is applied is a treatment temperature at which the discharge capacity will become nearly the lowest, the heat treatment is applied in a range of 900° C. to not higher 1500° C. in practice, preferably in a range of 900° C. to not higher 1200° C.

The carbonaceous particles (C) are carbonaceous porous powders obtained by baking and pulverizing a thermally kneaded mixture of pitch and carbon black before sizing by the use of an air sifter, and screening.

More specifically, carbon black and pitch are charged into a kneader, thermal kneading is applied to a mixture of the carbon black and the pitch while heating is applied thereto, and after the pitch is sufficiently wetted against the carbon black and a composite material thereof is formed, the composite material is taken out of the kneader and transferred to a vessel made of metal, ceramics, or graphite, whereupon baking is carried out in a non-oxidizing atmosphere. Generally by taking out the composite material while being mixed/stirred inside the kneader, and so on, the same is discharged in the form of agglomerates ranging from several mm to several cm in size, so that the agglomerates, as they are, can be charged into the vessel to then be baked. The agglomerates may be molded into an optional shape easy to handle, as necessary, with the use of a molding machine, to be subsequently baked.

As is the same case with the graphite particles (A), baking is conducted in a range of 900 to 1500° C. The reason why the baking is conducted in such a temperature range as described is the same as the reason in the case of the graphite particles (A).

Mechanical pulverization is conducted after the baking such that a particle size suitable to the initial purpose can be obtained. Sizing with the use of an air sifter or a vibrating screen as necessary is carried out in order to adjust the particle size distribution.

Further, a mixing ratio of the pitch to the carbon black is determined by taking into consideration the intended properties of the carbonaceous particles (C) to be produced and oil absorption quantity of the carbon black, but one measure of the mixing ratio is the pitch in a range of on the order of 25 to 250 parts by weight against 100 parts by weight of the carbon black. If the mixing ratio of the pitch is less than 25 parts by weight against 100 parts by weight of the carbon black, the amount of the pitch is insufficient, resulting in a formation of an unsatisfactory composite with the carbon black. If the mixing ratio of the pitch is in excess of 250 parts by weight, the pitch will be excessive in ratio against the carbon black, so that the composite will be too close in properties to a baked product composed solely of the pitch, which represents a deviation from the purpose of the invention.

There are known several kinds of carbon blacks such as furnace black, acetylene black, ketene black, lamp black, and so forth, differing in respect of raw material, production method, and so forth. Those carbon blacks are further classified into complex brands according to magnitude of a structure (DBP oil absorption quantity: expressed by magnitude of dibutyl phthalate oil absorption) formed by linkage of a plurality of primary particles several tens of nm in size, size of a specific surface area, measured by absorption/desorption of nitrogen gas, difference in pore diameter distribution, and difference in other characteristics.

There is no particular limitation to the brand of carbon black in actual use, however, it is necessary to select a brand and determine a blending amount of the brand in consideration of various physical properties as intended.

The amount of carbon black is set to a range of 2 to 50 parts by weight against 100 parts by weight of natural graphite. If the carbon black is less than 2% against the natural graphite, fine protrusions become small in their amount, so that satisfactory results cannot be obtained. If the carbon black exceeds 50%, a specific surface area will become excessively large, which is not preferable because a large capacity loss occurs.

For the pitch, use can be made of a common binder pitch and an impregnation pitch. Use may be made of either a coal based pitch or a petroleum based pitch, but a softening point is in a range of 70 to 250° C., preferably in a range of 80 to 150° C., and more preferably in a range of 80 to about 120° C. If the softening point is excessively low, this will not be preferable because of an inconvenience in handling and increase in cost due to a low carbonaceous residue ratio. Conversely, if the softening point is excessively high, the pitch will be unsuitable for executing processing in a common heating kneader, so that use of special facilities will be unavoidable. Thus, the pitch having the excessively high softening point is unsuitable for mass production. Further, the excessively high softening point is not desirable in terms of cost because the pitch price will increase.

The heat treatment temperature is in a range of 900° C. to 3200° C. A heat treatment temperature below 900° C. is not preferable because the functional groups remain on the respective surfaces of the particles and will react with lithium ions, so that there occurs an increase in capacity loss and there exists an infection point of the discharge curve in the vicinity of 1V.

In case of obtaining the graphite particles (B), a baking temperature during the graphitization should be not lower than 2000° C. at the lowest. However, in order to enhance the discharge capacity • charge/discharge efficiency, graphitization is preferably carried out at a temperature as high as possible. As the baking temperature for obtaining the graphite particles (B), not lower than 2600° C. is required at the lowest, preferably not lower than 2800° C., and more preferably not lower than 3000° C. If the baking temperature exceeds 3400° C., the graphite will undergo sublimation and, therefore, heat treatment at 3200° C. is a practical limitation.

In the case of making an electrode by use of the graphite particles according to the invention, if the electrode is for use in a notebook PC, mobile phone, and so forth, a conventional particle size in general use, that is, the average particle diameter $D_{50}$ in a range of on the order of 8 to 25 μm is preferable. Meanwhile, in the case of an intermediate sized/large sized lithium ion secondary battery for use in an electric bicycle (E-bike), a hybrid electric vehicle (HEV), and so forth, the graphite particles are coated to a relatively small thickness in order to ensure the electrical conductivity of an electrode and to cause the electrode to exhibit output characteristics, so that the average particle diameter $D_{50}$ is in a range of on the order of 3 to 15 μm, more preferably in a range of on the order of 5 to 13 μm. Further, there is the need for limiting the maximum particle diameter to a size less than the thickness of the electrode in any application. Furthermore, means for adding a supplementary electrical conductive agent as necessary may be selected as appropriate in addition to the above. If the average particle diameter $D_{50}$ is not more than 3 μm, this will cause a difficulty in pulverization, so that there arise problems such as an increase in production cost, increase in specific surface area, considerable deterioration in handling characteristics, and so forth.

Further, if the average particle diameter $D_{50}$ is not less than 15 μm, it is neither possible to apply the graphite particles to the electrode to have a small thickness, nor to obtain sufficient contact between the particles, thereby causing electrical resistance to increase, and output characteristics to deteriorate, so that high-output characteristics cannot be obtained.

It is appropriate to set the maximum particle diameter to not more than 55 μm. Because an electrode in an application for a high output is formed such that the thickness thereof after being pressed is in a range of about 40 to 50 μm, if the maximum particle diameter is 55 μm or more, it is not possible to obtain a smooth and uniform coating.

Further, if an electrode is formed to have a large thickness exceeding 50 μm under prevailing circumstances, the average particle diameter and/or the maximum particle diameter of an electrode active material can be increased according to the thickness of the electrode, however, it is preferable that the average particle diameter $D_{50}$ is kept to 25 μm at most and the maximum particle diameter is kept to on the order of 75 μm.

In general, in the case of a graphite negative electrode material being in use, a material of a series containing no propylene carbonate (hereinafter referred to as PC) is used for an electrolyte. PC is prone to cause a decomposition reaction on the surface of graphite, thereby causing an increase in internal pressure of a battery, and generating a large quantity of decomposition products (SEI coating) on the negative electrode material, resulting in deterioration of battery characteristics, so that PC is not preferable.

For effecting normal charge/discharge, even in an electrolyte with PC added thereto, it is necessary to check the decomposition reaction of PC occurring on the negative electrode material. That is, it is necessary to render the surface of the particle low in crystallinity. With a negative electrode active material composed singly of the graphite particles (A) obtained by baking a thermally kneaded mixture of the spherical natural graphite particles, carbon black and pitch at a temperature in the range of 900 to 1500°, or a negative electrode active material composed of a mixture of the graphite particles (A) and the graphite particles (B) obtained by further baking the graphite particles (A) at a high temperature to be then graphitized, formed at a mixing ratio of the graphite particles (A)=50 to 100%, the graphite particles (B)=0 to 50%, and (A)+(B)=100%, charge/discharge is possible without capacity loss, even in the electrolyte with PC (PC concentration in the electrolyte is not more than 33%) added thereto.

However, if a proportion of the graphite particles (B) exceeds 50%, a decomposition quantity of PC will increase, thereby causing the initial charge/discharge efficiency to deteriorate and, therefore, graphite particles (B) in excess of 50% in proportion are not preferable. Furthermore, since the quantity of the SEI coating as formed will increase, the electrical resistance will increase, thereby deteriorating the high-rate characteristics and cycle characteristics.

Since the graphite particles (A) have an amorphous surface and the particle surface is hard, it is difficult to increase the electrode density to not less than 1.7 g/cm$^3$. In order to increase the electrode density to not less than 1.7 g/cm$^3$, there is the need for rendering the particles susceptible to being crushed. On the other hand, in the case of the graphite particles (B) obtained by graphitization at the high temperature, the electrode density can be easily increased to not less than 1.7 g/cm$^3$. However, since the graphite particle (B) is susceptible to being crushed as compared with the graphite particle (A), the flow paths of the electrolyte tend to be blocked when the electrode density is increased.

If a mixing ratio of the graphite particles (A)=0 to 30%, the graphite particles (B)=70 to 100%, and (A)+(B)=100% is adopted, there will be no capacity loss, even at an electrode density of not less than 1.7 g/cm$^3$. That is, it becomes possible to enhance the discharge capacity per unit volume (mAh/cm$^3$). In this case, in consideration of the reaction of the particles with PC, it is necessary to use PC such that the PC concentration in the electrolyte is not more than 10%.

If the mixing ratio of the graphite particles (A) exceeds 30%, it becomes difficult to increase the electrode density to not less than 1.7 g/cm$^3$.

PREFERRED EMBODIMENT OF THE INVENTION

Tests on Higher Density and Higher Capacity

Example 1

Figure 1:
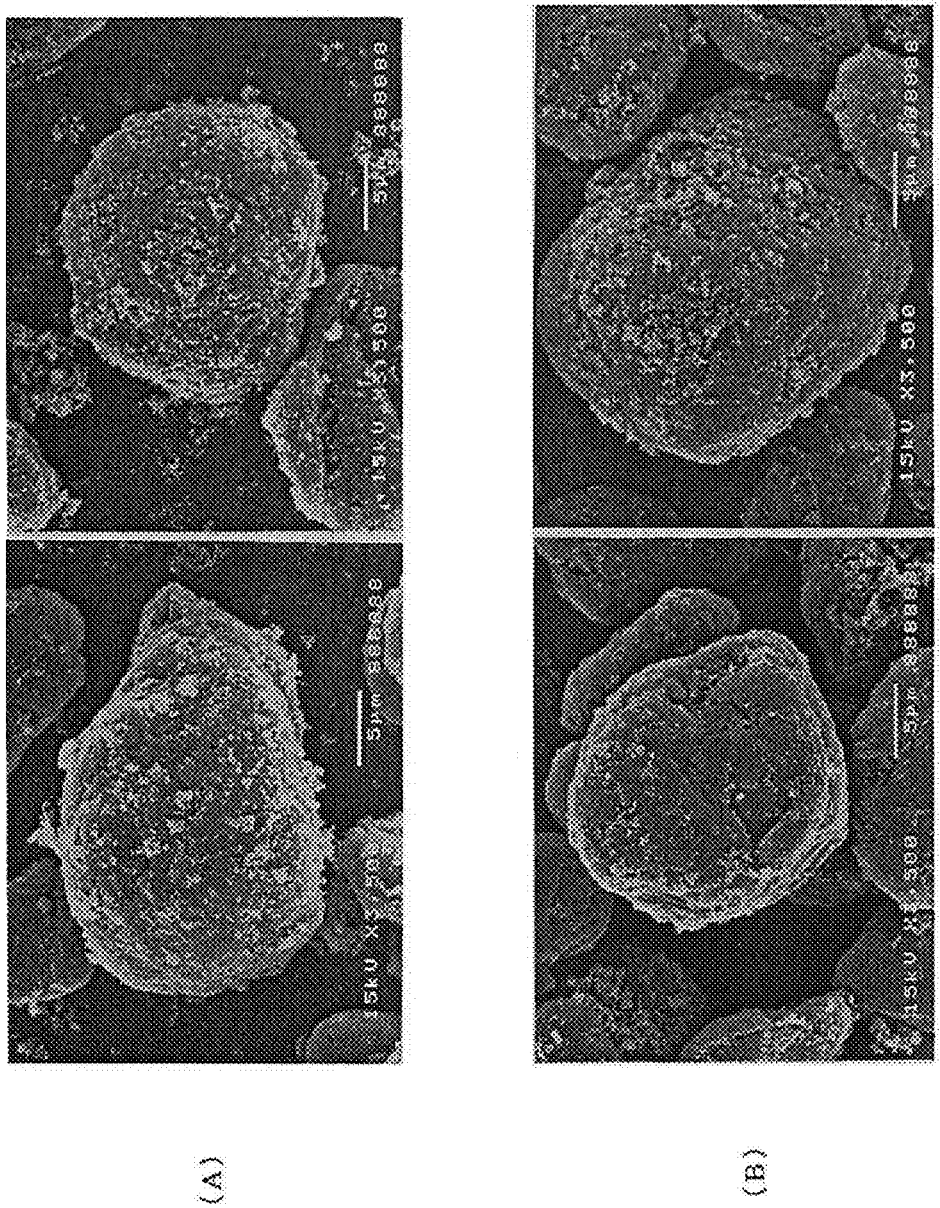
FIGS. 1(A) and 1(B) each shows electron micrographs of graphite particles according to the invention.

A mixture was formed by mixing 100 parts by weight of natural graphite rendered spherical in shape with 20 parts by weight of acetylene black (particle diameter 62 nm and specific surface area by BET method of 68 m$^2$/g) and, further, 18 parts by weight of isotropic pitch was added to the mixture to be subsequently thermally kneaded with the use of a heating kneader at 150° C. for one hour. The mixture was baked at 1000° C. in a non-oxidizing atmosphere before pulverization and sizing, thereby obtaining graphite particles (A) substantially spherical in shape, each particle having fine protrusions on the surface thereof. In FIG. 1 (A), there are shown electron micrographs of the graphite particles (A).

The graphite particles (A) were further baked at 3000° C., having thereby obtained graphite particles (B). It was found that an average particle diameter $D_{50}$=11.97 μm, the maximum particle diameter $D_{top}$=38.9 μm, an interlayer distance of the lattice plane, $d_{002}$=3.357 Å, as measured by X-ray diffraction according to Gakushin method for X-ray diffraction of carbon, and a specific surface area by BET method, SSA=3.39 m$^2$/g. In FIG. 1(B), there are shown electron micrographs of the graphite particles (B).

By mixing 2 parts by weight of SBR (styrene-butadiene rubber) and 2 parts by weight of CMC (carboxymethylcellulose) with 100 parts by weight of the graphite particles (B), a mixture was formed, a slurry of the mixture was prepared with the use of distilled water as solvent, and the slurry was then applied to a copper foil with the use of a doctor blade to be dried at 120° C., and pressed at a pressure of it/cm$^2$, whereupon the electrode density was found to be 1.70 g/cm$^3$.

When the electrode density was 1.80 g/cm$^3$, the time(s) required for complete permeation of an electrolyte of 1M LiPF$_6$/EC:MEC(1:1), 2 μl in volume, was 1520 seconds.

Example 2

The graphite particles (B) according to Example 1 and the graphite particles (A) as a precursor of the graphite particles (B) were mixed with each other at a blending ratio of A/B=30/70 (by weight), thereby producing a negative electrode active material. It was found that an average particle diameter $D_{50}$=11.96 μm, the maximum particle diameter $D_{top}$=38.9 μm, the interlayer distance of the lattice plane, $d_{002}$=3.357 Å, as measured by X-ray diffraction according to Gakushin-method for X-ray diffraction of carbon, and the specific surface area by BET method, SSA=3.47 m$^2$/g.

The negative electrode active material was mixed with a binder, and a mixture was subsequently applied to a copper foil, and dried before being pressed at a pressure of it/cm$^2$, whereupon the electrode density was 1.65 g/cm$^3$.

When the electrode density was 1.80 g/cm$^3$, the time(s) required for complete permeation of an electrolyte of 1M LiPF$_6$/EC:MEC(1:1), 2 μl in volume, was 1170 seconds.

Comparative Example 1

A mixture was formed by adding 18 parts by weight of isotropic pitch to 100 parts by weight of natural graphite rendered spherical in shape and subsequently thermally kneaded with the use of a heating kneader at 150° C. for one hour. The mixture was baked at 1000° C. in a non-oxidizing atmosphere, to thereby obtain graphite particles.

As for the particle size, the average particle diameter $D_{50}$=14.0 μm, the maximum particle diameter $D_{top}$=38.9 μm, and the interlayer distance of the lattice plane, $d_{002}$=3.357 Å, as measured by X-ray diffraction according to the Gakushin-method for the X-ray diffraction of carbon, while the specific surface area by BET method, SSA=1.25 m$^2$/g.

The graphite particles obtained were used for a negative electrode active material and were mixed with a binder, and the mixture was subsequently applied to a copper foil and dried before being pressed at a pressure of 1 t/cm$^2$, whereupon the electrode density was 1.46 g/cm$^3$.

When the electrode density was 1.80 g/cm$^3$, the time(s) required for complete permeation of an electrolyte of 1M LiPF$_6$/EC:MEC(1:1), 2 μl in volume, was 1520 seconds.

Comparative Example 2

The graphite particles according to Comparative Example 1 were further baked at 3000° C. to be thereby graphitized. It was found that a particle size was an average particle diameter $D_{50}$=13.1 μm, $D_{top}$=38.9 μm, and the interlayer distance of the lattice plane $d_{002}$=3.356 Å, as measured by X-ray diffraction according to the Gakushin-method for X-ray diffraction of carbon, while the specific surface area by the BET method, SSA=1.37 m$^2$/g.

A negative electrode active material composed of the graphite particles obtained was mixed with a binder and a mixture was subsequently applied to a copper foil and dried before being pressed at a pressure of 1 t/cm$^2$, whereupon the electrode density was 1.76 g/cm$^3$.

When the electrode density was 1.80 g/cm$^3$, the time(s) required for complete permeation of an electrolyte of 1M LiPF$_6$/EC:MEC(1:1), 2 μl in volume, was 2990 seconds. Those results are shown in Table 1

TABLE 1

|     | example 1 | example 2 | comparative example 1 | comparative example 2 |
| --- | --- | --- | --- | --- |
| "a" | 1.70 | 1.65 | 1.46 | 1.76 |
| "b" | 1520 | 1170 | 1520 | 2990 |

Remarks: "a" = electrode density (g/cm$^3$) after pressed at a contact pressure of 1 t/cm$^2$, "b" = electrolyte permeation time (sec) at the time when electrode density is 1.80 g/cm$^3$ As shown in Table 1, with the graphite particles according to Example 1, and the graphite particles according to Example 2, respectively, the electrode density (g/cm$^3$) after pressing was higher, press-workability was excellent, electrolyte permeation time was short, and permeability was excellent.

With Examples 1 and 2, the electrolyte permeation time was 1520 seconds, and 1170 seconds, respectively, in the case where the electrode density was 1.80 g/cm$^3$, indicating that the electrolyte permeation time was the same as the conventional one or shorter than that, so that those graphite particles are high in density and electrolyte permeability, and excellent as the negative electrode active material. With Comparative Example 2, the reason why the electrolyte permeation time was as long as 2990 seconds was that the graphite particles were crushed by pressing, thereby blocking the flow paths of the electrolyte. In contrast, with Example 1, although the graphite particle (B) was susceptible to being crushed due to pressing, the flow paths were maintained due to the presence of the protrusions on the surface of each of the particles, so that the electrolyte permeation time was short.

In Table 2, there are shown the discharge capacity and discharge efficiency when the electrode density is varied to 1.6, 1.7, and 1.8 (g/cm$^3$), respectively, when the graphite particles according to Example 1, and the graphite particles according to Example 2, respectively, were used for the negative electrode active material. Charge/discharge was conducted with a double-pole coin cell using Li metal as a counter electrode and 1M LiP$_6$/EC:MEC(1:1) as an electrolyte. A constant-current charge was first carried out at a current value 0.5 mA/cm$^2$ to be switched to a constant-voltage charge upon a voltage value reaching 0.01V, and the constant-voltage charge was continued until the current value came down to 0.01 mA/cm$^2$. After completion of the constant-voltage charge, the constant-current discharge was carried out at the current value 0.5 mA/cm$^2$, completing the discharge upon the voltage value reaching 1.5V.

It is evident from Table 2 that the graphite particles according to the invention are excellent because the discharge capacity and discharge efficiency did not deteriorate, even if the electrode density increased.

TABLE 2

| | electrode density (g/cm$^3$) | | |
|---|---|---|---|
| | 1.6 | 1.7 | 1.8 |
| example 1 | 352/91.8 | 351/90.4 | 350/90.6 |
| example 2 | 353/91.3 | 352/90.3 | 351/90.5 |

Remarks: discharge capacity (mAh/g)/discharge efficiency (%)

Examples Concerning PC Resistance Characteristics

Example 3

The graphite particles (A), that is, the precursor of the graphite particles (B) according to Example 1, were used as they were. The particle size of the graphite particles (A) was an average particle diameter D$_{50}$=11.9 µm, the maximum particle diameter D$_{top}$=38.9 µm, and it was found that the interlayer distance of the lattice plane was d$_{002}$=3.357 Å, as obtained by X-ray diffraction according to the Gakushin-method for the X-ray diffraction of carbon, and the specific surface area by the BET method was SSA=3.65 m$^2$/g.

A slurry was prepared by mixing 5 parts by weight of PVdF {poly(vinylidiene fluoride)} or 2 parts by weight of SBR and CMC, respectively, with 100 parts by weight of the graphite particles (A), and the slurry was applied to a copper foil by use a doctor blade and dried at 120° C. before applying roll-pressing thereto, to thereby form an electrode. The electrode after pressing had a thickness of 80 µm and an electrode density of 1.6 g/cm$^3$. A double-pole coin cell using Li metal as a counter electrode, and 1M LiP$_6$/EC:MEC(1:2) and 1M LiP$_6$/PC:EC:MEC(1:3:6) as an electrolyte, was manufactured, whereupon charge/discharge tests were conducted. The constant-current charge was carried out at a current value of 0.5 mA/cm$^2$ to be switched to the constant-voltage charge upon the voltage value reaching 0.01V, and the constant-voltage charge was continued until the current value came down to 0.01 mA/cm$^2$. After completion of the constant-voltage charge, the constant-current discharge was carried out at the current value of 0.5 mA/cm$^2$, completing the discharge upon the voltage value reaching 1.5V. The discharge capacity is shown in Table 3.

The difference in discharge capacity and discharge efficiency between the electrolyte containing PC and the electrolyte containing no PC is hardly observed, and the charge/discharge can be implemented without causing a capacity loss.

TABLE 3

| binder | electrolyte | discharge capacity (mAh/g) | discharge efficiency (%) |
|---|---|---|---|
| PVdF | EC:MEC(1:2) | 348 | 90 |
| | PC:EC:MEC(1:3:6) | 352 | 90 |
| SMR/CMC | EC:MEC(1:2) | 351 | 92 |
| | PC:EC:MEC(1:3:6) | 351 | 92 |

Example 4

The graphite particles (B) according to Example 1 were mixed with the graphite particles (A) according to Example 3 at a blending ratio of A/B=50/50 (by weight), thereby producing a negative electrode active material. It was found that the average particle diameter D$_{50}$=11.95 µm, the maximum particle diameter D$_{top}$=38.9 µm, and the interlayer distance of the lattice plane was d$_{002}$=3.357 Å, as measured by X-ray diffraction according to the Gakushin-method for the X-ray diffraction of carbon, and the specific surface area by BET method was SSA=3.52 m$^2$/g.

When a negative electrode had a thickness of 80 µm and electrode density of 1.80 g/cm$^3$, and during a time period of a change in voltage value from 0.01V to 1.5V, the discharge capacity and discharge efficiency were 351 mAh/g, and 90.5%, respectively, if 1M LiP$_6$/EC:MEC(1:2) was used as an electrolyte, while the discharge capacity and the discharge efficiency were 351 mAh/g, and 90.0%, respectively, if 1M LiP$_6$/PC:EC:MEC(1:3:6) was used as the electrolyte.

In the case of the electrolyte with PC added thereto, the discharge capacity and the discharge efficiency were excellent without undergoing deterioration.

Example and Comparative Example Concerning Rapid Charge/Discharge

Example 5

Example 5 is similar to Example 3 except that furnace black (particle diameter: 68 nm, a specific surface area by the BET method: 23 m$^2$/g) was used in place of the acetylene black.

The particle size of the graphite particles (A) was an average particle diameter D$_{50}$=13.5 µm, the maximum particle diameter D$_{top}$=38.9 µm, and it was found that the interlayer distance of the lattice plane was d$_{002}$=3.357 Å, as measured by the Gakushin-method for the X-ray diffraction of carbon, and the specific surface area by the BET method was SSA=2.18 m$^2$/g.

In the case where the thickness of the negative electrode after pressing was 40 µm and the electrode density of the negative electrode was 1.40 g/cm$^3$ with reference to Example 3, Example 5, and Comparative Example 1, respectively, the discharge capacity and discharge efficiency from 0.01 V to 1.5V, and the capacities including discharge capacity at a current value 10 C up to 1.0V after adjustment to a discharge depth (DOD)=50% and discharge capacity when the constant-current discharge was carried out at a current value 2 C up to 0V, are as shown in Table 4. With Example 3 and Example 5, respectively, the discharge capacity, and the discharge efficiency were enhanced as compared with Comparative Example 1. Furthermore, as the capacity at the time of rapid charge/discharge was high, it can be said that the high-power characteristics were excellent.

TABLE 4

|  | discharge capacity (mAh/g) | efficiency (%) | from DOD = 50% | |
|---|---|---|---|---|
|  |  |  | 10C discharge capacity (mAh/g) | 2C discharge capacity (mAh/g) |
| Example 3 | 380 | 87.0 | 137 | 22.5 |
| Example 5 | 369 | 85.5 | 141 | 55.7 |
| Comparative Example 1 | 353 | 85.1 | 81 | 16.2 |

Tests on Cycle Characteristics

Figure 2:
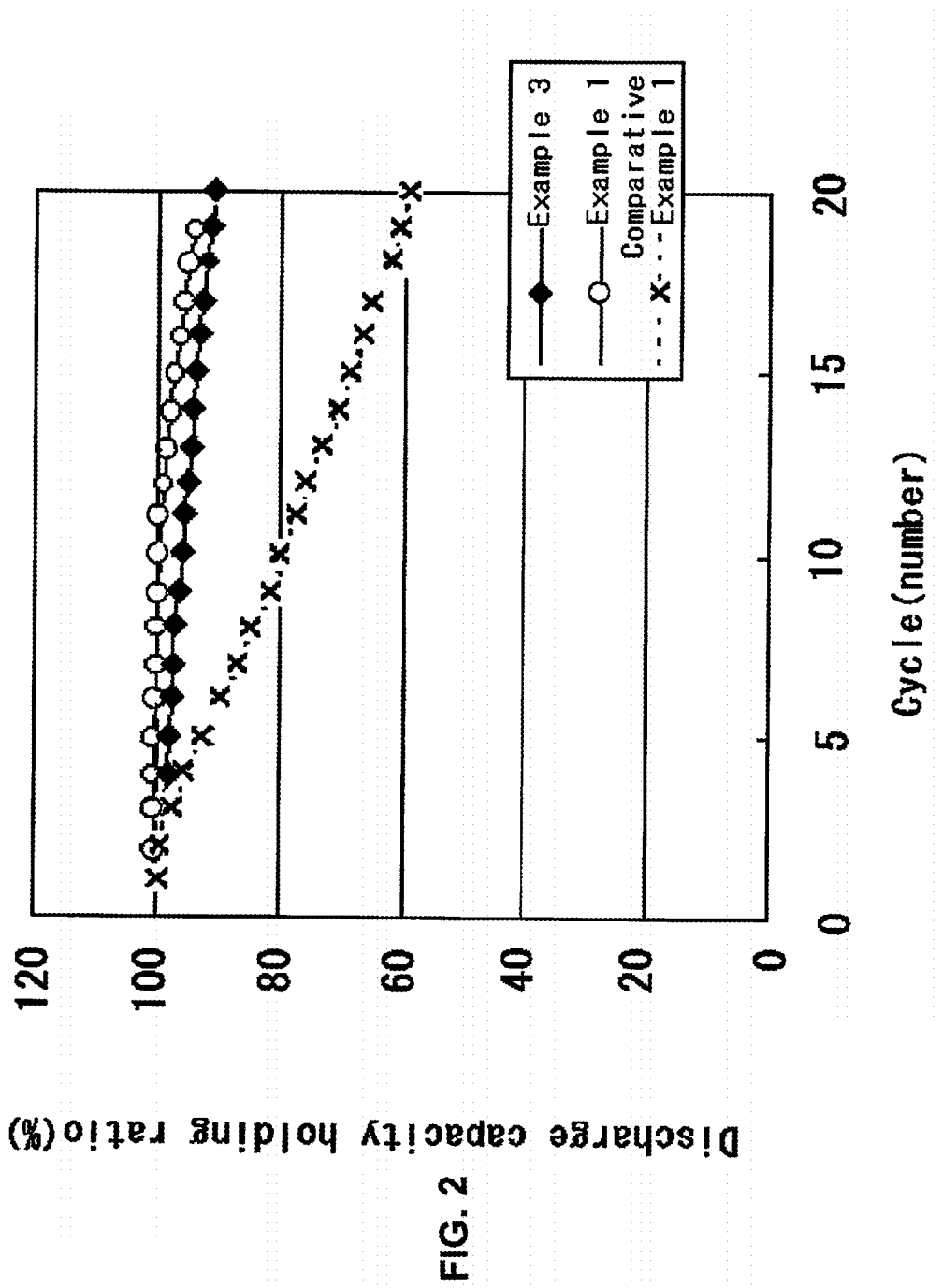
FIG. 2 is a graph showing cycle characteristics.

A cycle test was conducted on an electrode having an electrode density of 1.6 g/cm$^3$, using the graphite particles according to Example 1, Example 3, and Comparative Example 1, respectively. The constant-current charge was carried out at a current value of 0.5 C to be switched to the constant-voltage charge upon the voltage value reaching 0.01V, and continuing the charge until the current value came down to 0.01 mA/cm$^2$. After completion of the charge, the constant-current discharge was carried out at the current value of 0.5 C, completing the discharge upon the voltage value reaching 1.5V. The cycle tests were conducted by repeating the charge/discharge described above. The results of the tests are shown in FIG. 2. In contrast to an electrode using the graphite particles according to Comparative Example 1, with each particle having no fine protrusions on the surface thereof, wherein as cycle numbers increase, so a discharge capacity holding ratio deteriorated, the graphite particles according to the invention, used for the negative electrode active material, had a small decrease in the discharge capacity, indicating excellent cycle characteristics.

Figure 3:
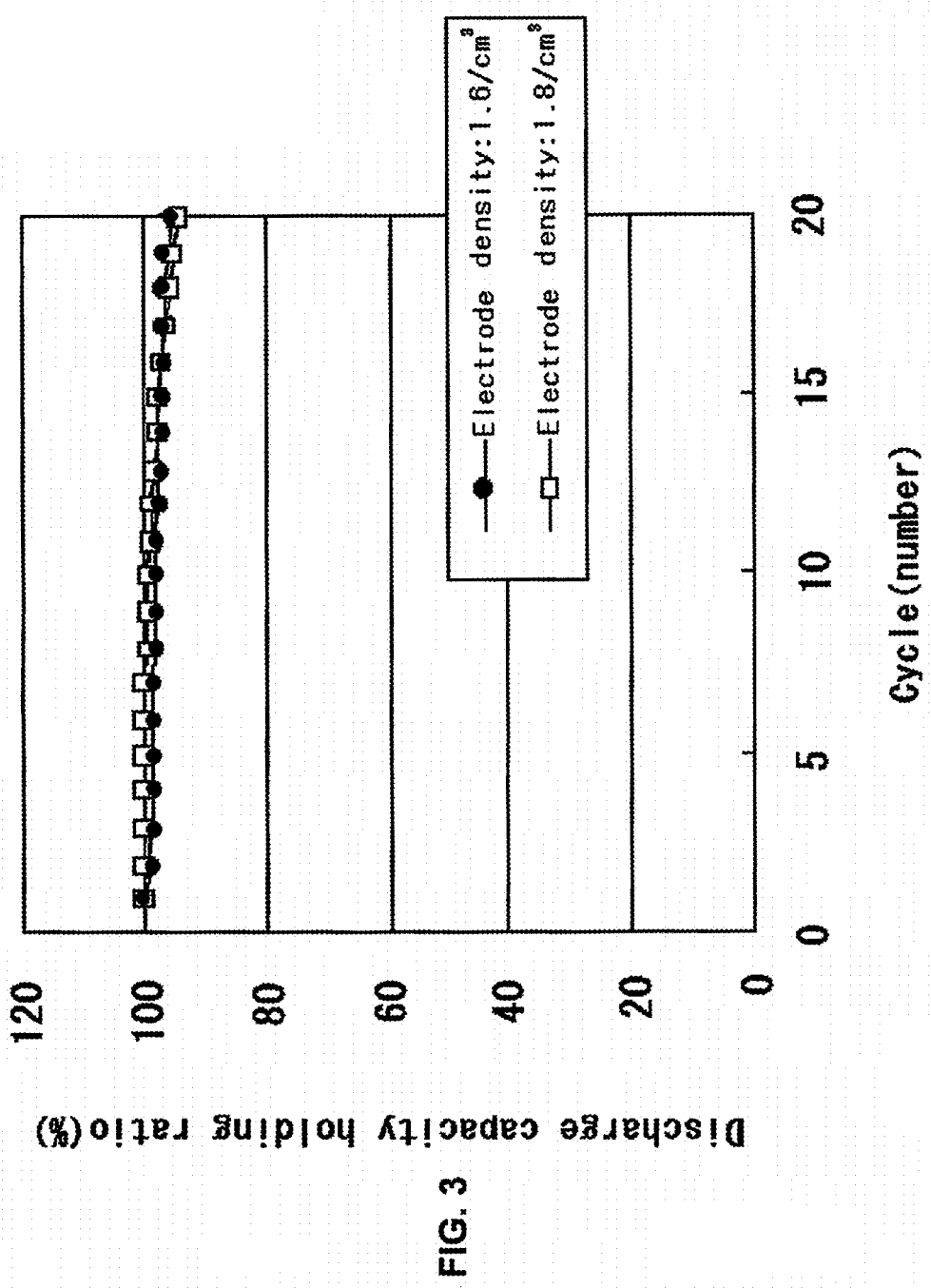
FIG. 3 is a graph showing the cycle characteristics of a high-density electrode.
Figure 4:
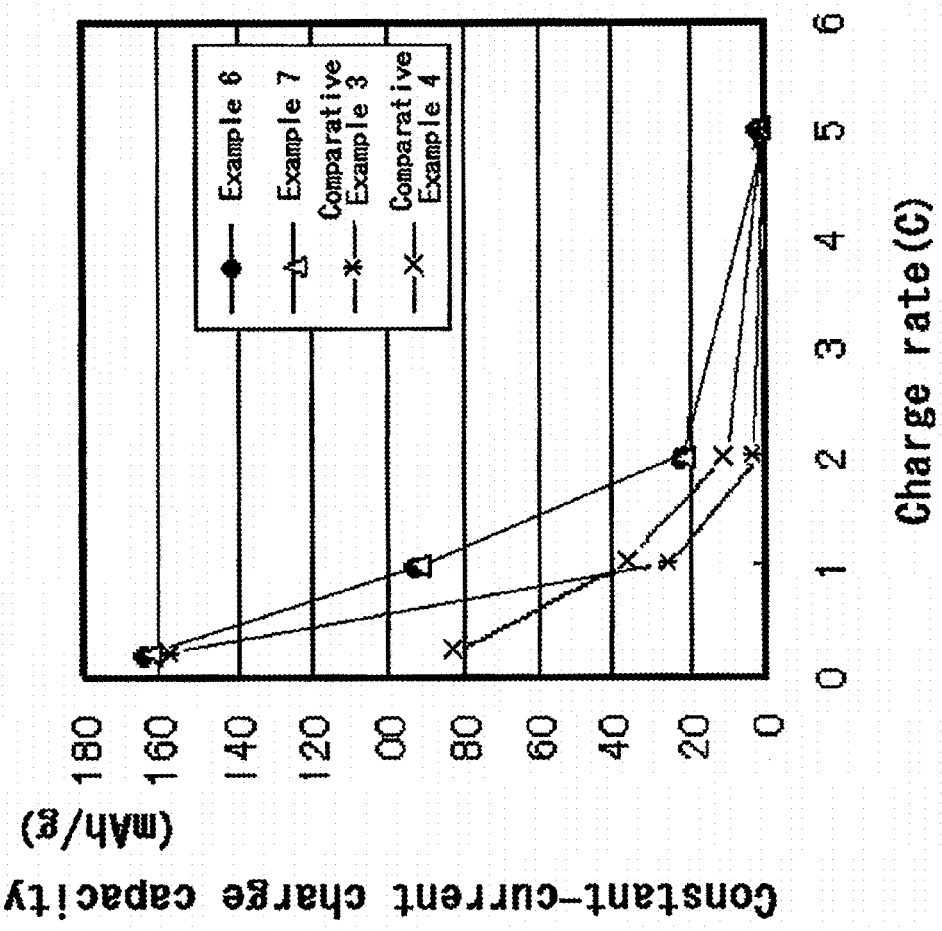
FIG. 4 is a graph showing the constant-current charge capacities according to Examples and Comparative Examples, respectively.
Figure 5:
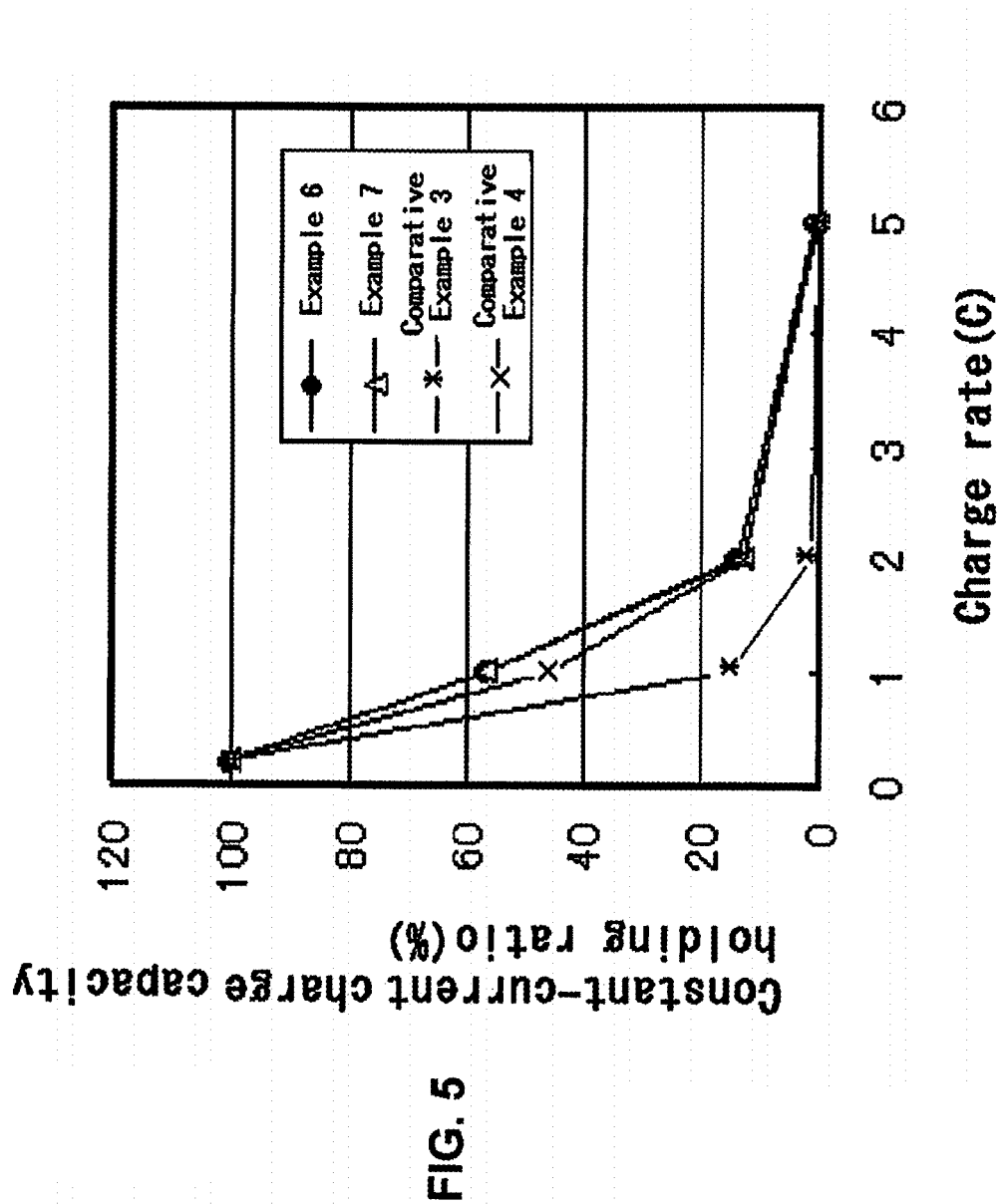
FIG. 5 is a graph showing the constant-current charge capacity holding ratios according to Examples and Comparative Examples, respectively.
Figure 6:
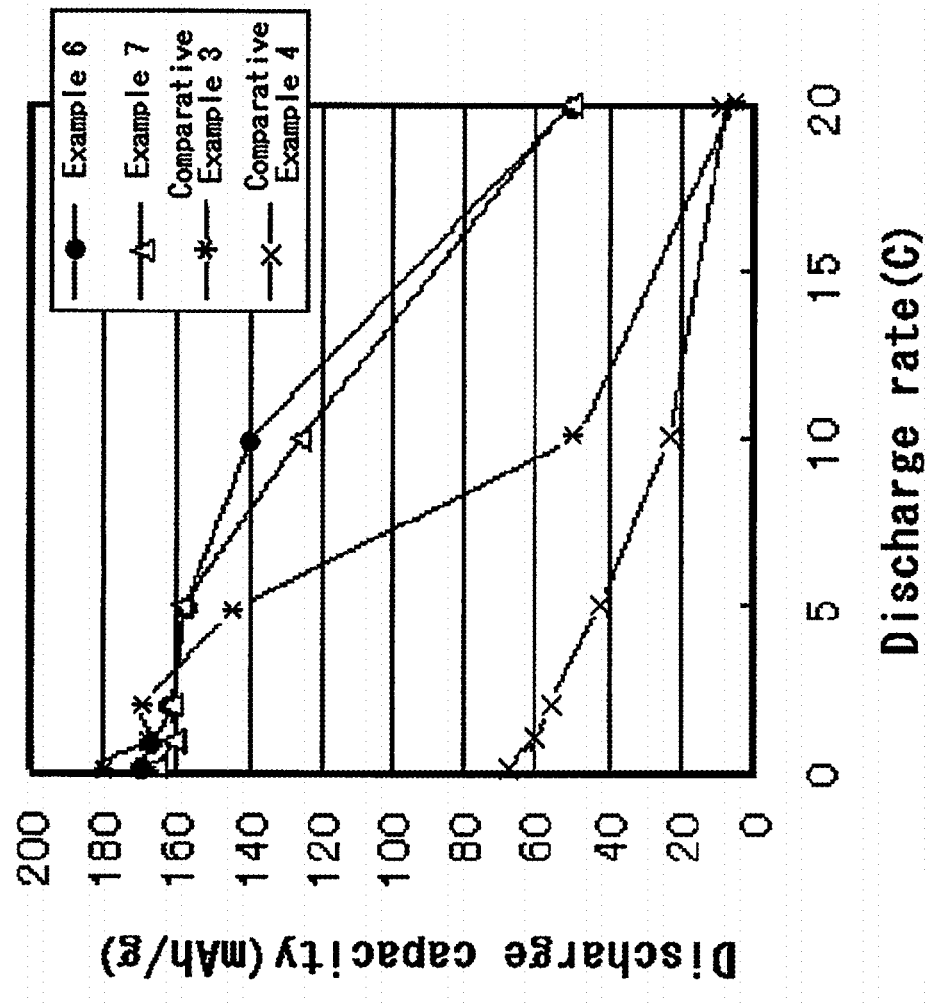
FIG. 6 is a graph showing the discharge capacities according to Examples and Comparative Examples, respectively.
Figure 7:
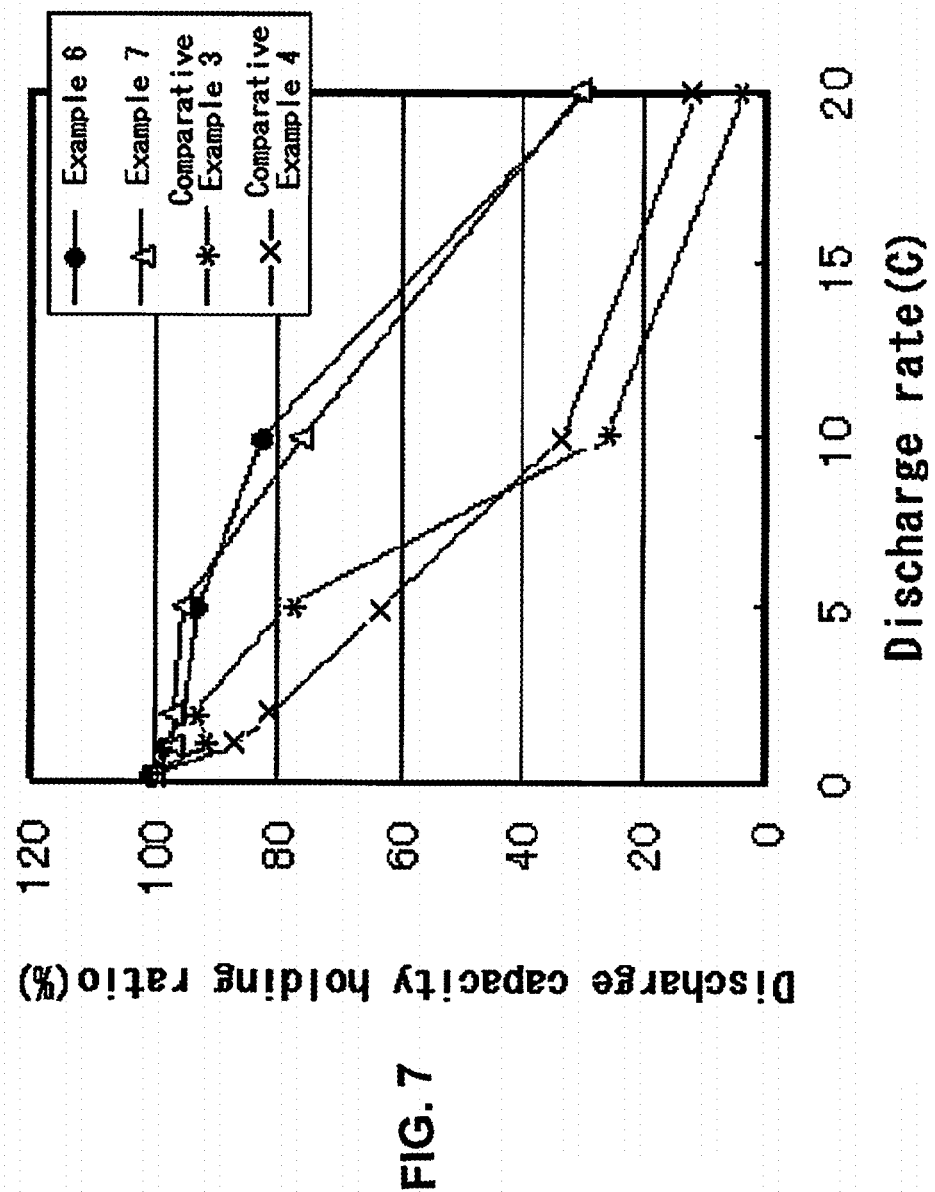
FIG. 7 is a graph showing the discharge capacity holding ratios according to Examples and Comparative Examples, respectively.

Further, in FIG. 3, there is shown the cycle characteristics of Example 1 for a high-density application type when the electrode density was 1.8 g/cm$^3$. In the figure, there is shown the cycle characteristics identical to that in the case of the electrode density being 1.6 g/cm$^3$, indicating excellent cycle characteristics without causing a deterioration in cycle characteristics, due to an increase in the electrode density.

The graphite particles (A) and the carbonaceous particles (C) were produced, respectively, by varying the conditions as follows, and tests were run on the performance of various mixtures thereof, as a negative electrode material for a lithium ion secondary battery. The mixing ratios in the following description are in terms of percent by weight.

Now, there are shown hereinafter examples of the negative electrode active material for the lithium ion secondary battery, composed of graphite particles (A1, A2, A3, . . . ) obtained by impregnating and coating not less than two kinds of matrices, the average particle diameter of a spherical natural graphite particle making up each of the matrices being varied, with a mixture of pitch and carbon black, respectively, to be baked at a temperature in a range of 900 to 1500° C. before pulverization and screening, the graphite particles (A1, A2, A3, . . . ) mixed with each other, the graphite particles (A1, A2, A3, . . . ) mixed with the carbonaceous particles (C1, C2, . . . ) at an optional mixing ratio according to a purpose such as powder physical properties, and so forth.

The Graphite Particles (A)

A1: A mixture was formed by mixing 100 parts by weight of natural graphite reduced to a spherical shape, having an average particle diameter $D_{50}$ of 11 μm, and the maximum particle diameter $D_{top}$=28 μm, with 20 parts by weight of a commercially available furnace black having an arithmetic average particle diameter of 46 nm, DBP oil absorption quantity of 106 ml/100 g, a BET specific surface area of 38 m$^2$/g, and iodine absorption of 40 mg/g, and further, 15 parts by weight of binder pitch having a softening point at 110° C. was added to the mixture to be subsequently thermally kneaded at 150° C. for one hour with the use of a heating kneader. Then, the mixture was baked at 1000° C. in a non-oxidizing atmosphere to be pulverized and sifted through a screen with 38 μm openings, to thereby obtain the graphite particles (A1) substantially spherical in shape.

A2: By mixing 100 parts by weight of natural graphite reduced to a spherical shape, having an average particle diameter $D_{50}$ of 11 μm and maximum particle diameter $D_{top}$=28 μm, with 20 parts by weight of a commercially available acetylene black having an arithmetic average particle diameter of 35 nm, DBP oil absorption quantity of 160 ml/100 g, a BET specific surface area of 69 m$^2$/g, and iodine absorption of 93 mg/g, a mixture was formed, and further, 18 parts by weight of binder pitch having a softening point at 110° C. was added to the mixture to be subsequently thermally kneaded at 150° C. for one hour with the use of a heating kneader. Then, the mixture was baked at 1000° C. in a non-oxidizing atmosphere to be pulverized and sifted through the screen with 38 μm openings, to thereby obtain graphite particles (A2) substantially spherical in shape.

A3: By mixing 100 parts by weight of natural graphite reduced to a spherical shape, having an average particle diameter $D_{50}$ of 23 μm and maximum particle diameter $D_{top}$=65 μm, with 20 parts by weight of a commercially available acetylene black having an arithmetic average particle diameter of 35 nm, DBP oil absorption quantity of 160 ml/100 g, BET specific surface area of 69 m$^2$/g, and iodine absorption of 93 mg/g, a mixture was formed, and further, 16 parts by weight of binder pitch having a softening point at 110° C. was added to the mixture to be subsequently thermally kneaded at 150° C. for one hour with the use of the heating kneader. Then, the mixture was baked at 1000° C. in a non-oxidizing atmosphere to be pulverized and sifted through the screen with 38 μm openings, to thereby obtain graphite particles (A3) substantially spherical in shape.

A4: By mixing 100 parts by weight of natural graphite reduced to a spherical shape, having an average particle diameter $D_{50}$ of 23 μm and maximum particle diameter $D_{top}$=65 μm, with 20 parts by weight of commercially available furnace black having an arithmetic average particle diameter of 46 nm, DBP oil absorption quantity of 106 ml/100 g, BET specific surface area of 38 m$^2$/g, and iodine absorption of 40 mg/g, a mixture was formed, and further, 16 parts by weight of binder pitch having a softening point at 110° C. was added to the mixture to be subsequently thermally kneaded at 150° C. for one hour with the use of the heating kneader. Then, the mixture was baked at 1000° C. in a non-oxidizing atmosphere to be pulverized and sifted through the screen with 38 μm openings, to thereby obtain graphite particles (A4) substantially spherical in shape.

A5: By mixing 100 parts by weight of natural graphite reduced to a spherical shape, having an average particle diameter $D_{50}$=5 μm and maximum particle diameter $D_{top}$=17 µm, with 20 parts by weight of a commercially available furnace black having an arithmetic average particle diameter of 46 nm, DBP oil absorption quantity of 106 ml/100 g, BET specific surface area of 38 m²/g, and iodine absorption of 40 mg/g, a mixture was formed, and further, 20 parts by weight of binder pitch having a softening point at 110° C. was added to the mixture to be subsequently thermally kneaded at 150° C. for one hour with the use of the heating kneader. Then, the mixture was baked at 1000° C. in a non-oxidizing atmosphere to be pulverized and sifted through the screen with 38 µm openings, to thereby obtain graphite particles (A5) substantially spherical in shape.

A6: By mixing 100 parts by weight of natural graphite reduced to a spherical shape, having an average particle diameter $D_{50}$=5 µm and maximum particle diameter $D_{top}$=17 µm, with 10 parts by weight of a commercially available furnace black having an arithmetic average particle diameter of 24 nm, DBP oil absorption quantity of 115 ml/100 g, BET specific surface area of 117 m²/g, and iodine absorption of 80 mg/g, a mixture was formed, and further, 20 parts by weight of binder pitch having a softening point at 110° C. was added to the mixture to be subsequently thermally kneaded at 150° C. for one hour with the use of the heating kneader. Then, the mixture was baked at 1000° C. in a non-oxidizing atmosphere to be pulverized and sifted through the screen with 38 µm openings, to thereby obtain graphite particles (A6) substantially spherical in shape.

The Carbonaceous Particles (C)

C1: By adding 50 parts by weight of a binder pitch having a softening point at 110° C. to 100 parts by weight of a commercially available furnace black having an arithmetic average particle diameter of 24 nm, DBP oil absorption quantity of 115 ml/100 g, BET specific surface area of 117 m²/g, and iodine absorption of 80 mg/g, a mixture was formed, and the mixture was subsequently thermally kneaded at 150° C. for one hour with the use of the heating kneader. Then, the mixture was baked at 1000° C. in a non-oxidizing atmosphere to be pulverized and sifted through the screen with 38 µm openings, to thereby obtain carbonaceous particles (C1).

C2: By adding 50 parts by weight of a binder pitch having the softening point at 110° C. to 100 parts by weight of a commercially available furnace black having an arithmetic average particle diameter of 23 nm, DBP oil absorption quantity of 108 ml/100 g, BET specific surface area of 123 m²/g, and iodine absorption of 115 mg/g, a mixture was formed, and the mixture was subsequently thermally kneaded at 150° C. for one hour with the use of the heating kneader. Then, the mixture was baked at 1000° C. in a non-oxidizing atmosphere to be pulverized and sifted through the screen with 38 µm openings, to thereby obtain the carbonaceous particles (C2).

Example 6

A mixture of the graphite particles (A) and the carbonaceous particles (C) was produced by mixing at a blending ratio of A2:C1=90:10. Table 5 shows the various physical properties of the mixture as produced.

Example 7

The graphite particles (A) were mixed with the carbonaceous particles (C) at a blending ratio of A2:C1=85:15. Table 5 shows the various physical properties of a mixture as produced.

Example 8

The graphite particles (A) were mixed with the carbonaceous particles (C) at a blending ratio of A1:C1=90:10. Table 5 shows the various physical properties of a mixture as produced.

Example 9

The graphite particles (A) were mixed with the carbonaceous particles (C) at a blending ratio of A1:C2=94:6. Table 5 shows the various physical properties of a mixture as produced.

Example 10

The graphite particles (A) were mixed with the carbonaceous particles (C) at a blending ratio of A1:A5:C1=85:10:5. Table 5 shows the various physical properties of a mixture as produced.

Example 11

The graphite particles (A) were mixed with the carbonaceous particles (C) at a blending ratio of A2:A3:A6:C1=70:10:10:10. Table 5 shows the various physical properties of a mixture as produced.

Comparative Example 3

A mixture was formed by adding 18 parts by weight of isotropic pitch to 100 parts by weight of natural spherical graphite to be subsequently thermally kneaded with the use of a Warner kneader at 150° C. for one hour. The mixture was baked at 3000° C. in a non-oxidizing atmosphere to be subsequently graphitized. The various physical properties of the product thus obtained are shown in Table 5. Comparative Example 4

Heat treatment at 500° C. was applied to coal pitch (optical isotropy) containing 10% of QI content and having a softening point at 110° C. under nitrogen gas bubbling (21l/min·kg), to thereby obtain a carbon precursor of 30% optical anisotropy according to observation with a polarization microscope. The carbon precursor contained 0.3% of volatile matter. A softening point thereof was measured by Metlar method, but could not be measured indicating that measurement of the softening point was not possible. The carbon precursor was pulverized, and sized to be reduced to have an average particle diameter $D_{50}$=8 µm to be subsequently baked at 1300° C. in a non-oxidizing atmosphere. The various physical properties of a product thus obtained are shown in Table 5.

TABLE 5

|  | particle size (µm) | | | | $d_{002}$ | $L_{c002}$ | | | | |
|---|---|---|---|---|---|---|---|---|---|---|
|  | $D_{10}$ | $D_{50}$ | $D_{90}$ | $D_{top}$ | (nm) | (nm) | a | b | c | d |
| Example 6 | 7.79 | 13.15 | 23.85 | 46.08 | 0.336 | >100 | 0.93 | 6.25 | 352 | 84 |
| Example 7 | 7.71 | 13.21 | 24.12 | 46.08 | 0.336 | >100 | 0.91 | 5.91 | 347 | 84 |
| Example 8 | 7.41 | 12.56 | 22.63 | 38.86 | 0.336 | >100 | 1.00 | 6.39 | 358 | 86 |
| Example 9 | 7.61 | 12.70 | 22.13 | 38.86 | 0.336 | >100 | 0.95 | 6.37 | 356 | 87 |

TABLE 5-continued

| | particle size (μm) | | | | $d_{002}$ | $L_{c002}$ | | | | |
|---|---|---|---|---|---|---|---|---|---|---|
| | $D_{10}$ | $D_{50}$ | $D_{90}$ | $D_{top}$ | (nm) | (nm) | a | b | c | d |
| Example 10 | 6.34 | 11.64 | 21.15 | 38.86 | 0.336 | >100 | 0.89 | 6.48 | 360 | 86 |
| Example 11 | 5.84 | 11.34 | 23.91 | 54.64 | 0.336 | >100 | 0.90 | 7.42 | 354 | 85 |
| Comparative Example 3 | 10.47 | 17.08 | 28.47 | 46.08 | 0.336 | >100 | 1.00 | 1.08 | 360 | 89 |
| Comparative Example 4 | 3.98 | 10.94 | 23.73 | 46.08 | 0.349 | 1.8 | 1.16 | 1.51 | 236 | 83 |

Remarks:
a = bulk density (g/cm³),
b = specific surface area (m²/g),
c = discharge capacity (mAh/g), and
d = discharge efficiency (%)

As shown in Table 5, with any of Examples 6 to 11, the interlayer distance of the lattice plane $d_{002}$ was found to fall in the range of 0.335 to 0.337 nm, and the discharge capacity indicated a high capacity in a range of 350 to 360 mAh/g.

Meanwhile, with Comparative Example 3, the interlayer distance of the lattice plane $d_{002}$ was found in the same way as that for any of Examples 6 to 11, and the discharge capacity was found equivalent to that for any of Examples 6 to 11 although the specific surface area was as small as one fifth of that for any of Examples 6 to 11. With Comparative Example 4, the interlayer distance of $d_{002}$ was large as compared with Examples 6 to 11, respectively, exceeding 0.337 nm, and the discharge capacity indicated a fairly low value.

It has been confirmed that if paste obtained by adding an organic binder, and a dispersing medium to the negative electrode active material for the lithium ion secondary battery, according to any of Examples 6 to 11, before kneading, is applied to a current collector made of metal to be dried and pressed, thereby fabricating a negative electrode having a coating with a thickness in a range of 30 to 100 μm and electrode density in a range of 0.9 to 1.8 g/cm³ to enable a rapid charge/discharge, and render excellent high-output characteristics.

In FIGS. 4, 5, 6, and 7, there are shown constant-current charge capacity, a constant-current charge capacity holding ratio, discharge capacity, and a discharge capacity holding ratio, respectively, in the case of varying a charge rate, and a discharge rate, respectively, when use was made of, for example, a negative electrode having a coating thickness in a range of 30 to 50 μm, and electrode density in a range of 1.1 to 1.5 g/cm³, fabricated by applying a paste obtained by adding an organic binder and a dispersing medium to negative electrode active materials for a lithium ion secondary battery, according to the Examples and Comparative Examples, respectively, before kneading, to a current collector made of metal to be further dried and pressed.

With both Example 6 and Example 7, deterioration in the constant-current charge capacity, constant-current charge capacity holding ratio, discharge capacity, and discharge capacity holding ratio, respectively, was found to be less as compared with Comparative Examples 3 and 4, respectively, in the case of charge/discharge carried out by increasing the charge rate, and the discharge rate, respectively, indicating that Example 6 and 7 were excellent in both rapid-charge and rapid-discharge performances.

By the use of laser Raman spectroscopic analysis and wide-range X-ray diffraction, measurement was taken on the physical properties of the negative electrode active material according to the invention. The measurement conditions in detail are shown hereunder.

For the laser Raman spectroscopic analysis, use was made of Ramanor T-64000 model manufactured by Jobin Yvon/Atago Bussan. The analysis conditions in detail are as follows.

Measurement mode: macro—Raman
Measurement disposition: 60°
Beam diameter: 100 μm
Light source: Ar+laser/514.5 nm
Laser power: 10 mW
Diffraction grating: Single 600 gr/mm
Dispersion: Single 21 A/mm
Slit: 100 μm
Detector: CCD/Jobin Yvon 1024×256
Measurement was taken by optionally selecting 3 points from the surface of a specimen.

In the laser Raman spectroscopic analysis of the negative electrode active material for the lithium ion secondary battery according to the invention, there is observed a Raman spectrum considered as a mixed system of not less than two kinds. Accordingly, it is difficult to numerically express the Raman spectrum by an R-value, that is, a ratio $(I_D/I_G)$ of intensity $I_D$ of the D-band (a peak appearing in the vicinity of 1360 cm$^{-1}$) to intensity $I_G$ of the G-band (a peak appearing in the vicinity of 1600 cm$^1$), or by a value corresponding to a half-value width of the G-band. That is, it can be said that it is meaningless to work out the R-value for convenience's sake by directly reading the intensity of the respective peaks from the peaks as obtained.

For interpretation of the spectrum, separation of the components of each band was carried out by fitting. As the spectrum was obtained as a mixed system mainly comprising the low crystalline and the high crystalline, the G-band was separated between a low crystalline component in the vicinity of 1600 cm$^{-1}$ and a high crystalline component in the vicinity of 1580 cm$^{-1}$. On the other hand, in the case of the D-band in the vicinity of 1360 cm$^{-1}$, a well-defined difference in peak position and half-value width was not observed, so that the separation of the components was difficult to execute.

Since the D-band cannot be divided, it becomes practically impossible to handle the R-value. However, it is possible to work out the area percentage of each of the components as a parameter for numerically expressing a shape of the spectrum, as a contribution ratio.

The fitting was carried out on the basis of the Lorentz function for three components and a background component of one component. With the Raman band having the peak in the vicinity of 1600 cm$^{-1}$, a peak position was fixed to 1600 cm$^{-1}$. The background component is presumed to stem from amorphous carbon and since a shape of the spectrum thereof is unknown, the fitting was carried out through approximation by Gaussian function.

The base line was linearly approximated at 600 to 2000 cm$^{-1}$. There are shown hereinafter description of respective parameters directly read from the Raman spectrum as observed, or after the fitting:

Directly Reading

R: $I_D/I_G$
$I_D$: intensity of D-band (in the vicinity of 1360 cm$^{-1}$)
$I_D$: intensity of G-band (in the vicinity of 1600 cm$^{-1}$)

After the Fitting

R: $I_{1360}/I_{1600}$
$I_{1360}$: intensity of D-band (in the vicinity of 1360 cm$^{-1}$)
$I_{1380}$: intensity of Raman band in the vicinity of 1380 cm$^{-1}$ (amorphous component)
Inn': intensity of G-band (in the vicinity of 1580 cm$^{-1}$) (high crystalline component)
$I_{1600}$: intensity of G'-band (in the vicinity of 1600 cm$^{-1}$) (low crystalline component)
$\Delta v_{1580}$: band width of G-band (in the vicinity of 1580 cm$^{-1}$)
$\Delta v_{1600}$: band width of G'-band (in the vicinity of 1600 cm$^{-1}$)
contribution ratio: area intensity of each Raman band/the sum of area intensities of all the bands
$A_{1360}$: area intensity of D-band (in the vicinity of 1360 cm$^{-1}$)
$A_{1380}$: area intensity of Raman band in the vicinity of 1380 cm$^{-1}$ (amorphous component)
$A_{1580}$: area intensity of G-band (in the vicinity of 1580 cm$^{-1}$) (high crystalline component)
$A_{1600}$: are intensity of G'-band (in the vicinity of 1600 cm$^{-1}$) (low crystalline component)

A measurement depth of the Raman spectrum is dependent on the absorption coefficient of a specimen. In the case of a black material such as carbon, the measurement depth decreases. In the case of graphite, a measurement depth estimated from an absorption coefficient by excitation at 514.5 nm is presumably about 15 nm. In the case of an amorphous carbon, a measurement depth generally increases, presumably, to dozens of nm.

X-ray wide-range diffraction was carried out on the basis of the Gakushin-method for specifying a method for conducting structural analysis on the size of a crystallite of a synthetic carbon material with metallic silicon as the internal standard, mesh size, and so forth, using an X-ray diffraction apparatus RINT-Ultima III manufactured by Rigaku Co., Ltd.

By charging 60±0.1 g of a specimen into a graduated cylinder of 100 ml, setting the graduated cylinder to an in-house tap density measuring instrument with a cam provided therein, and tapping the specimen 700 times at a stroke of 10 mm, thereby working out a tap density from the volume of the specimen thus obtained.

A specific surface area was measured on the basis of a pore volume, pore diameter, absorption/desorption of nitrogen gas and, as a measuring instrument, use was made of an automatic specific surface area/pore diameter distribution measuring instrument Tristar 3000 manufactured by Micromeritics Corp.

The specific surface area was found by the BET multiple-point method whereby an absorption gas quantity obtained from an absorption isotherm is evaluated as a monomolecular layer to thereby calculate a specific surface area.

$$P/V(P_0-P)=(1/VmC)+\{(C-1)/VmC(P/P_0)\} \quad (1)$$

$$S=kVm \quad (2)$$

where
$P_0$: saturation vapor pressure
P: absorption equilibrium pressure
V: absorption quantity at an absorption equilibrium pressure P Vm: absorption quantity of a monomolecular layer
C: parameter concerning absorption heat
S: specific surface area
k: nitrogen monomolecular occupancy area 0.162 nm$^2$ The total pore volume was found from an equilibrium relative pressure (P/P$_0$) obtained from the absorption isotherm=a saturated absorption gas quantity in the vicinity of 0.99.

A volume of a micro-pore not more than 2 nm was found by the t-plot method whereby an absorption quantity is plotted against a thickness t of a nitrogen gas absorption film.

An absorption film thickness in a range of 0.35 to 0.50 nm was found according to Harkins & Jura expression:

$$t=[13.99/\{0.034-\log(P/P_0)\}]^{0.5} \quad (3)$$

where $P_0$: saturation vapor pressure, P: absorption equilibrium pressure.

An oil absorption quantity was measured according to JIS K6217, with the use of an absorption-quantity measuring instrument S-410 model manufactured by Asahi Soken Co. Ltd., using linseed oil.

Measurements on an average particle diameter and particle size distribution, respectively, were conducted with the use of an LMS-30 System developed by Seishin Enterprise Co., Ltd, whereby measurement was executed with water serving as a dispersing medium, and kept in an ultrasonic dispersion state by use of a trace surfactant as a dispersant.

For electrochemical charge/discharge tests, a water-based slurry was prepared by mixing 2 parts by weight of SBR and CMC, as a binder, respectively, with 100 parts by weight of the negative electrode active material, and the slurry was applied to a copper foil to have a thickness of 80 μm by use of a doctor blade to be dried at 120° C. before applying roll-pressing thereto, having thereby punched work in process into an electrode of ϕ12. The electrode after pressing was 40 μm in thickness.

Li metal was used for a counter electrode against the electrode, a group of the electrodes opposed each other, with a separator interposed therebetween, was formed, subsequently an electrolyte of 1M LiPF$_6$/EC:MEC(1:2) was added thereto, having thereby fabricated a coin cell, and the coin cell was subjected to the charge/discharge tests.

Charging/discharging were executed under conditions that the constant-current charge was first carried out at a current value 0.5 mA/cm$^2$ to be switched to the constant-voltage charge upon a voltage value reaching 0.01V and the constant-voltage charge was continued until the current value came down to 0.01 mA/cm$^2$. After completion of the constant-voltage charge, the constant-current discharge was carried out at the current value of 0.5 mA/cm$^2$, completing the discharge upon the voltage value reaching 1.5V.

In the measurement of rapid charge and rapid discharge, the discharge depth (DOD) was first at 100% for a discharge capacity of from 0 to 1V while the DOD prior to the measurement was adjusted to 50%. The rapid charge and the rapid discharge were carried out at the constant current by varying the C rate from the state of DOD=50%. Further, as for a capacity holding ratio, the capacity at 0.2 C was defined as 100%, having thereby found a variation ratio when the C rate was increased.

Figure 8:
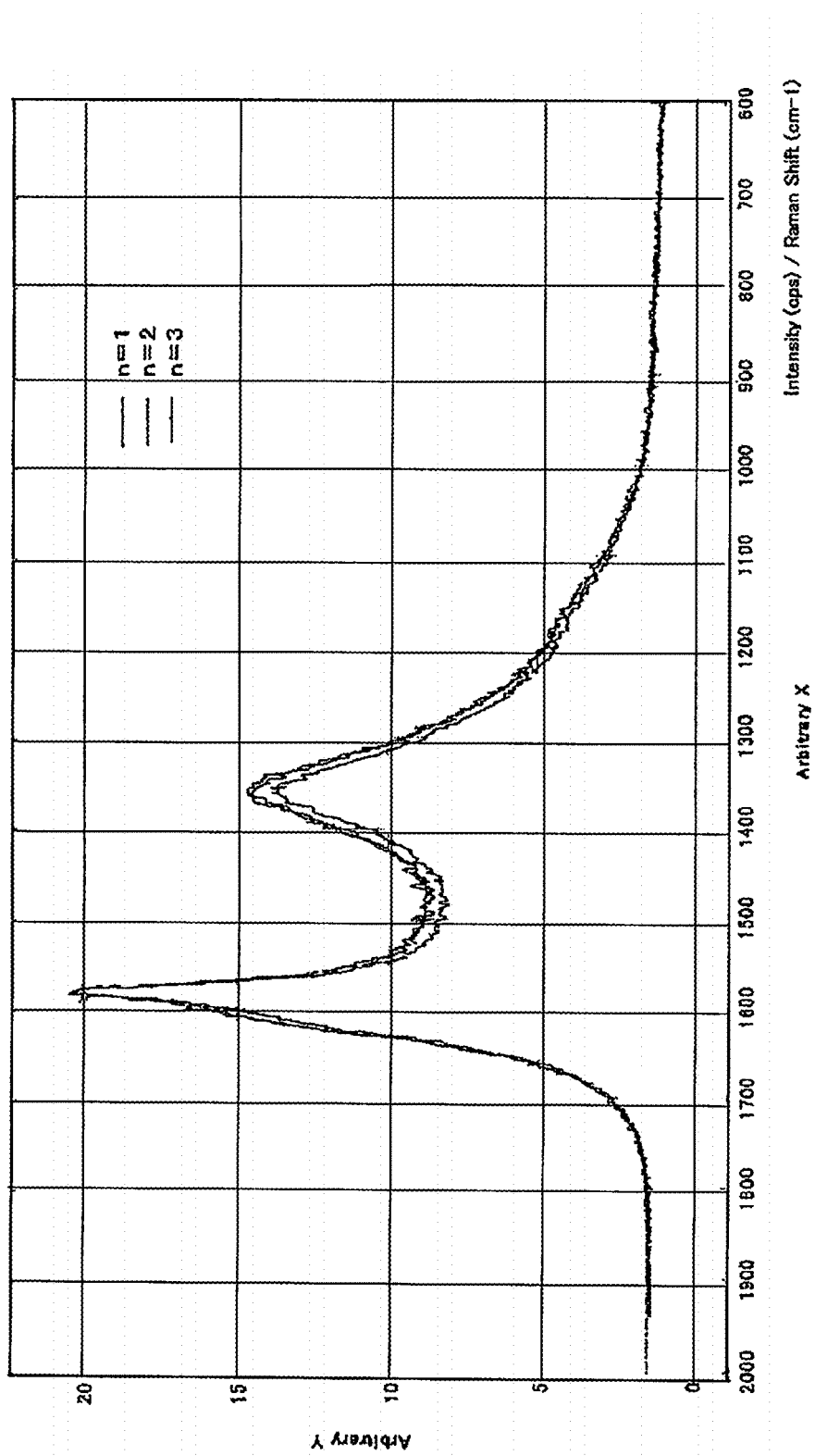
FIG. 8 is a graph showing the Raman spectrum of the graphite particles (A) according to the invention, obtained by Raman spectroscopy.

In FIG. 8, there is shown the Raman spectrum of the negative electrode active material according to Example 1, as an example of the Raman spectrum.

As shown in FIG. 8, a shoulder is observed near a peak in the vicinity of 1600 cm$^{-1}$.

Figure 9:
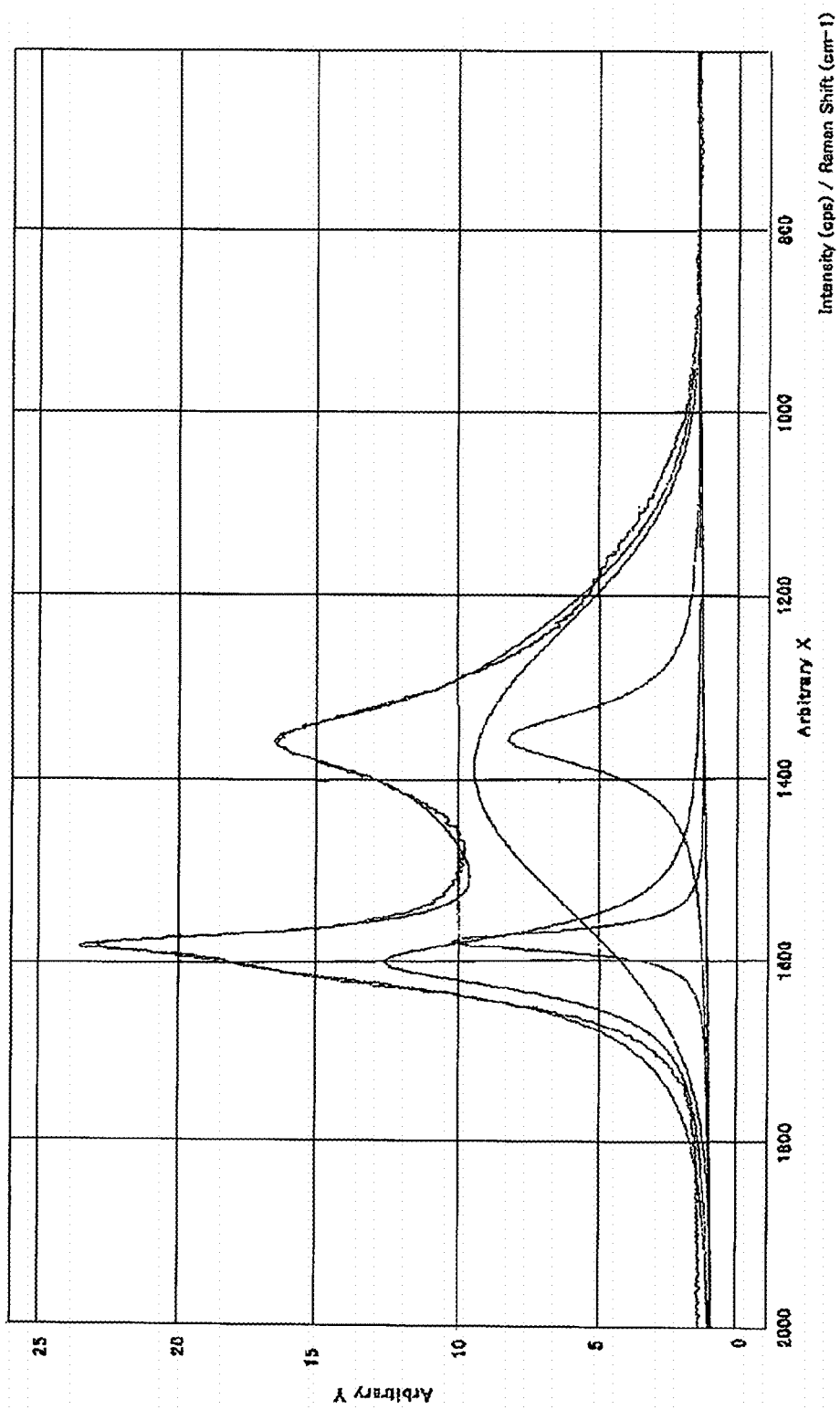
FIG. 9 is a graph showing the results of the fitting of the Raman spectrum of the graphite particles (A) according to the invention.

FIG. 9 shows the results of fitting of the Raman spectrum shown in FIG. 8. The peak in the vicinity of 1600 cm$^{-1}$ could be separated between the low crystalline component in the vicinity of 1600 cm$^{-1}$ and the high crystalline component in the vicinity of 1580 cm$^{-1}$.

Figure 10:
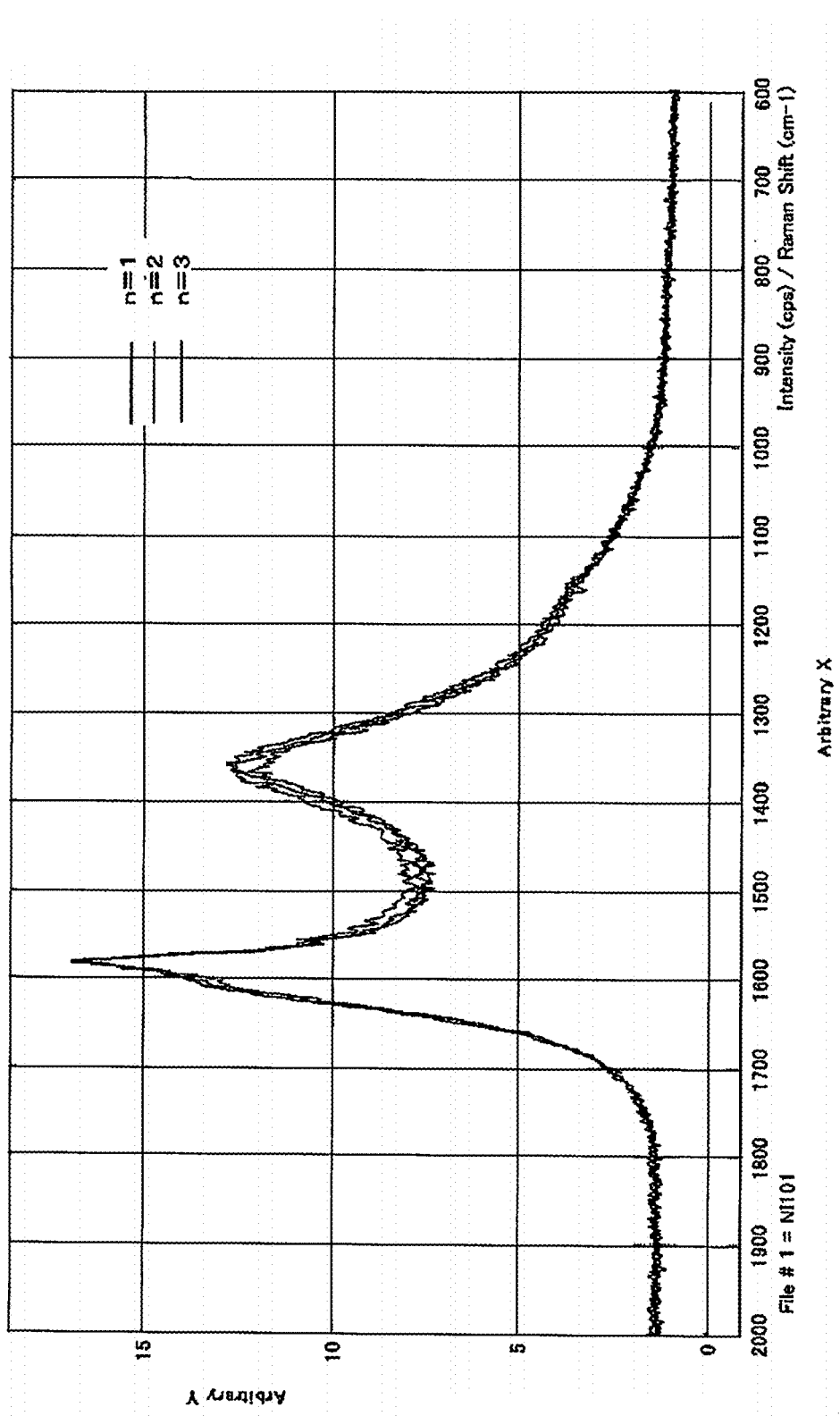
FIG. 10 is a graph showing the Raman spectrum of a negative electrode active material according to an Example of the invention.
Figure 11:
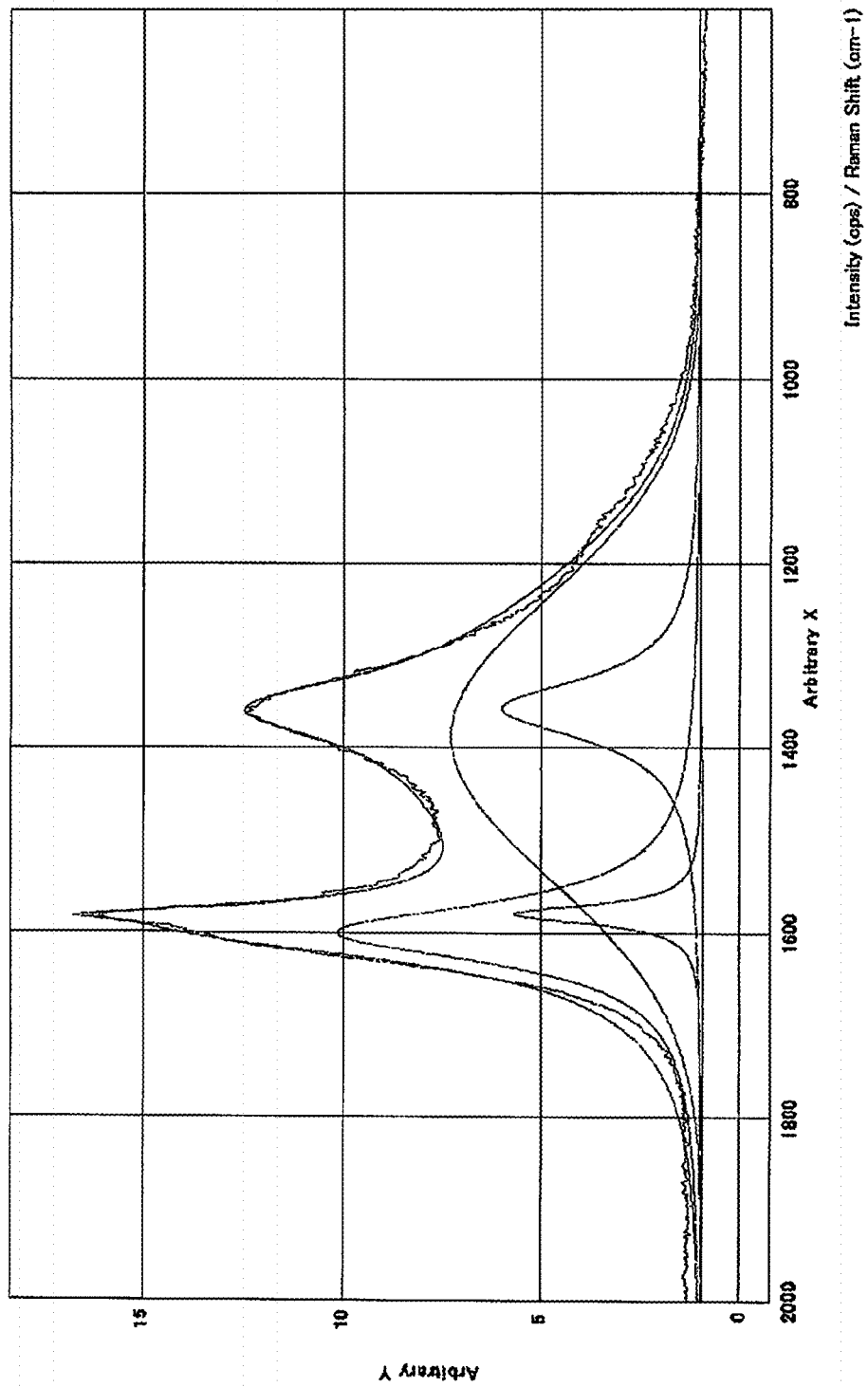
FIG. 11 is a graph showing the results of the fitting of the Raman spectrum of the negative electrode active material according to an Example of the invention.

The Raman spectrum shown in FIG. 10 indicates the Raman spectrum of the negative electrode active material, that is, the mixture of the graphite particles (A) and the carbonaceous particles (C), according to Example 10.

As shown in FIG. 10, a shoulder is observed near a peak in the vicinity of 1600 cm$^{-1}$.

With reference to the Raman band in FIG. 10, the peak intensity and the area intensity are shown in Tables 6 and 7, respectively.

TABLE 6

Raman Band-peak intensity, and band width

| $I_{1600}$ cps | $\Delta v_{1600}$ cm$^{-1}$ | $I_{1580}$ cps | $\Delta v_{1580}$ cm$^{-1}$ | $I_{1380}$ cps | $I_{1360}$ cps | $I_{1360}/I_{1580}$ | $I_{1360}/I_{1580}$ |
|---|---|---|---|---|---|---|---|
| 9.24 | 78.66 | 4.75 | 25.45 | 6.34 | 5.05 | 1.05 | 0.55 |

TABLE 7

Raman Band-area intensity

| $A_{1600}$ cps | $A_{1580}$ cps | $A_{1380}$ cps | $A_{1360}$ cps | contribution ratio (area percentage) | | | |
|---|---|---|---|---|---|---|---|
| | | | | $A_{1600}$ | $A_{1580}$ | $A_{1380}$ | $A_{1360}$ |
| 1091 | 187.3 | 2431 | 611.8 | 25% | 4% | 56% | 14% |

As described above, the carbon material of the multi-layer structure according to the present invention, having the G-band composite peak comprising the peaks in the vicinity of 1600 cm$^{-1}$, and 1580 cm$^{-1}$, respectively, and at least one peak in the vicinity of the D-band at 1380 cm$^{-1}$, in the Raman spectroscopic analysis using the argon laser Raman scattering light at the wavelength of 514.5 nm, wherein the interlayer distance of the lattice plane $d_{002}$, obtained by wide-range X-ray diffraction, is in the range of 0.335 to 0.337 nm, is a negative electrode active material for a lithium ion secondary battery, having both high capacity characteristics and high-output characteristics.

INDUSTRIAL APPLICABILITY

Numerous fine protrusions are present on the surface of each of the graphite particles according to the present invention, as shown in FIG. 1. By virtue of the fine protrusions present on the surface of each of the graphite particles, the number of contact points between the particles will increase as compared with the case of a particle having a smooth surface, so that numerous electrically conducting networks are built in a complex way within an electrode and the electrical resistance of the negative electrode is lowered, thereby rendering the graphite particles according to the present invention suitable for use as a negative electrode material having excellent rapid charge/discharge and power characteristics.

Since the negative electrode material is not only excellent in the rapid charge/discharge and power characteristics, but also is high in density, capacity and efficiency, the negative electrode material can be put to widespread use ranging from use in a small sized battery of a mobile phone, a notebook PC, and so forth, to use in a large sized battery in large equipment such as a hybrid electric vehicle (HEV).

The graphite particles (A), the surface of the particle being amorphous pitch and carbon black, singly, or the mixture of the graphite particles (A) and the graphite particles (B) obtained by further graphitizing the graphite particles (A), can be used even in an electrolyte with propylene carbonate (PC) added thereto.

Further, if the mixing ratio of the graphite particles (A)=0 to 30%, the graphite particles (B)=70 to 100%, and (A)+(B)=100% (by weight) is adopted, there is observed no deterioration in characteristics, even at the electrode density increased to not less than 17 g/cm$^3$, so that it becomes possible to enhance the discharge capacity per unit volume.

Further, a mixture of the graphite particles (A), each substantially spherical in shape and having fine protrusions on the surface thereof, obtained by impregnating and coating a matrix of natural graphite, rendered spherical in shape, with a mixture of pitch and carbon black, to be subsequently baked in the range of 900 to 1500° C., and the carbonaceous particles (C) obtained by baking the mixture of pitch and carbon black in the range of 900 to 1500° C. before pulverization and sizing, the mixture has a G-band composite peak comprising peaks in the vicinity of 1600 cm$^{-1}$, and 1580 cm$^{-1}$, respectively, and at least one peak in the vicinity of the D-band at 1380 cm$^{-1}$, in Raman spectroscopic analysis using argon laser Raman scattering light at a wavelength of 514.5 nm, the interlayer distance of the lattice plane $d_{002}$, obtained by wide-range X-ray diffraction, was in the range of 0.335 to 0.337 nm, and is of a multi-layer structure, so that the mixture has both high-capacity and high-output characteristics as a negative electrode active material for a lithium ion secondary battery, and is most suitable for use in a HEV.

The invention claimed is:

1. A negative electrode active material for a lithium ion secondary battery, comprising substantially spherical graphite particles (A) having protrusions composed of a composite material of carbon originating from carbon black and carbon originating from pitch formed on the surface thereof, the graphite particles having a G-band composite peak comprising peaks in the vicinity of 1600 cm$^{-1}$ and 1580 cm$^{-1}$, respectively, based on Raman spectroscopic analysis using argon laser Raman scattering light at a wavelength of 514.5 nm, and an interlayer distance of a lattice plane $d_{002}$ obtained by wide-range X-ray diffraction in a range of 0.335 to 0.337 nm, the graphite particles (A) being obtained by impregnating and coating a matrix of spherical natural graphite with a mixture of pitch and carbon black and then baking at a temperature of from 900-1500° C., the amount of carbon black being in a range of 20-50 parts by weight per 100 parts by weight of natural graphite.

2. The negative electrode active material according to claim 1, comprising a mixture of the graphite particles (A) and carbonaceous particles (C) obtained by baking a mixture of pitch and carbon black at a temperature of from 900-1500° C. and then conducting pulverizing and sizing steps.

3. A negative electrode fabricated by kneading the negative electrode active material of claim 1 with an organic binder to form a kneaded mixture, applying the kneaded mixture to a current collector made of a metal and subsequently drying and pressing the kneaded mixture to the current collector.

4. A negative electrode fabricated by kneading the negative electrode active material of claim 2 with an organic binder to form a kneaded mixture, applying the kneaded mixture to a current collector made of a metal and subsequently drying and pressing the kneaded mixture to the current collector.

5. The negative electrode of claim 4, where it has a coating thickness of from 30 to 100 μm and an electrode density of from 0.9 to 1.8 g/cm³.

6. The negative electrode active material according to claim 2, wherein the mixing ratio of pitch to carbon black in the carbonaceous particles (C) is 25-250 pbw pitch to 100 pbw carbon black.

7. A negative electrode active material according to claim 1, wherein said spherical natural graphite has an average particle diameter of from 3-25 μm.

8. The negative electrode active material according to claim 1, wherein the amount of carbon black is 20 parts by weight and the amount of pitch is 18 parts by weight, per 100 parts by weight of natural graphite.

* * * * *